US012233012B2

(12) United States Patent
Rodzewicz et al.

(10) Patent No.: US 12,233,012 B2
(45) **Date of Patent: *Feb. 25, 2025**

(54) SYSTEM AND METHOD FOR PATIENT TURNING AND REPOSITIONING

(71) Applicant: MÖLNLYCKE HEALTH CARE AB, Gothenburg (SE)

(72) Inventors: Patrick Rodzewicz, Gothenburg (SE); Conny Jakobsson, Lerum (SE); William Purdy, White Plains, NY (US); Robert Purdy, Bedford, NY (US)

(73) Assignee: MÖLNLYCKE HEALTH CARE AB, Gothenburg (SE)

( * ) Notice: Subject to any disclaimer, the term of this patent is extended or adjusted under 35 U.S.C. 154(b) by 1025 days.

This patent is subject to a terminal disclaimer.

(21) Appl. No.: 17/133,122

(22) Filed: Dec. 23, 2020

(65) Prior Publication Data

US 2021/0113403 A1 Apr. 22, 2021

Related U.S. Application Data

(63) Continuation of application No. 15/990,346, filed on May 25, 2018, now Pat. No. 10,925,790, which is a (Continued)

(51) Int. Cl.
*A61G 7/10* (2006.01)
*A61G 1/01* (2006.01)
(Continued)

(52) U.S. Cl.
CPC ........... *A61G 7/1026* (2013.01); *A61G 7/001* (2013.01); *A61G 7/1023* (2013.01); (Continued)

(58) Field of Classification Search
CPC ................ A61G 7/001; A61G 7/05753; A61G 7/05769; A61G 7/05776; A61G 7/05792; (Continued)

(56) References Cited

U.S. PATENT DOCUMENTS 1,334,901 A 3/1920 Higdon
2,466,142 A 4/1949 Yost
(Continued)

FOREIGN PATENT DOCUMENTS

AU 2015311732 4/2017
CN 201208361 3/2009
(Continued)

OTHER PUBLICATIONS

AU2019273845 , "First Examination Report", May 4, 2021, 4 pages.
(Continued)

*Primary Examiner* — David R Hare
(74) *Attorney, Agent, or Firm* — Kilpatrick Townsend & Stockton LLP

(57) ABSTRACT

The present disclosure relates to a patient support which can be used in a bed or flat surface and in particular to a system and method for support and offloading of the body and for turning and repositioning of a patient in a bed or on a flat surface. Features of the disclosure also relate to markings and other indicators used on the patient support which help guide caregivers in the proper use and correct patient positioning on the patient support.

19 Claims, 25 Drawing Sheets

Related U.S. Application Data continuation-in-part of application No. 15/730,268, filed on Oct. 11, 2017, now Pat. No. 10,596,051, and a continuation of application No. 13/834,911, filed on Mar. 15, 2013, now Pat. No. 9,833,371, and a continuation-in-part of application No. 13/493,582, filed on Jun. 11, 2012, now Pat. No. 9,504,621, and a continuation of application No. 13/493,641, filed on Jun. 11, 2012, now Pat. No. 9,814,642.

(60) Provisional application No. 61/614,791, filed on Mar. 23, 2012, provisional application No. 61/495,089, filed on Jun. 9, 2011, provisional application No. 61/495,096, filed on Jun. 9, 2011.

(51) Int. Cl.
*A61G 7/00* (2006.01)
*A61G 7/057* (2006.01)

(52) U.S. Cl.
CPC ........... *A61G 7/1025* (2013.01); *A61G 7/109* (2013.01); *A61G 1/01* (2013.01); *A61G 7/05753* (2013.01); *A61G 7/05769* (2013.01); *A61G 7/05776* (2013.01); *A61G 7/05792* (2016.11); *A61G 7/1021* (2013.01)

(58) Field of Classification Search
CPC .. A61G 7/1021; A61G 7/1025; A61G 7/1026; A61G 7/109; A61G 1/01; A61G 13/1025; A61G 13/121; A61G 13/123; A61G 13/1245; A61G 13/1265
USPC .......................... 5/81.1 T, 81.1 HS, 420, 703
See application file for complete search history.

(56) References Cited

U.S. PATENT DOCUMENTS 2,489,828 A 11/1949 Springer
2,748,399 A 6/1956 Joseph
3,158,875 A 12/1964 Fletcher
3,212,497 A 10/1965 Dickinson
3,331,087 A 7/1967 Barlow
3,526,908 A 9/1970 Davis
3,762,404 A 10/1973 Sakita
3,769,642 A 11/1973 Warman
3,829,914 A 8/1974 Treat
3,840,920 A 10/1974 Voelker
3,849,813 A 11/1974 Neilson
3,968,530 A 7/1976 Dyson
4,005,498 A 2/1977 Starr et al.
4,024,861 A 5/1977 Vincent
4,045,830 A 9/1977 Loeb et al.
4,051,565 A 10/1977 Berge
4,139,920 A 2/1979 Evans
4,211,218 A 7/1980 Kendrick
4,213,213 A 7/1980 Burnett
4,272,856 A 6/1981 Wegener et al.
4,347,213 A 8/1982 Rogers, Jr.
4,371,997 A 2/1983 Mattson
4,428,087 A 1/1984 Horn
4,472,847 A 9/1984 Gammons et al.
4,493,877 A 1/1985 Burnett
4,517,690 A 5/1985 Wegener
4,566,445 A 1/1986 Jelsma et al.
4,665,908 A 5/1987 Calkin
4,736,474 A 4/1988 Moran et al.
4,741,057 A 5/1988 Rosier et al.
4,977,629 A 12/1990 Jones
4,989,285 A 2/1991 Troncone et al.
5,009,318 A 4/1991 Lepinoy
5,044,031 A 9/1991 Sherwood et al.
5,060,324 A 10/1991 Marinberg et al.
5,065,464 A 11/1991 Blanchard et al.
5,067,189 A 11/1991 Weedling et al.
5,092,007 A 3/1992 Hasty
5,103,517 A 4/1992 Krouskop
5,103,518 A 4/1992 Gilroy et al.
5,121,756 A 6/1992 Koledin
5,243,722 A 9/1993 Gusakov
5,329,655 A 7/1994 Garner
5,421,874 A 6/1995 Pearce
5,489,259 A 2/1996 Jacobs et al.
5,549,743 A 8/1996 Pearce
5,556,169 A 9/1996 Parrish et al.
5,626,150 A 5/1997 Johnson et al.
5,626,657 A 5/1997 Pearce
5,708,999 A 1/1998 Priolo et al.
5,742,958 A 4/1998 Solazzo
5,794,289 A 8/1998 Wortman et al.
5,806,796 A 9/1998 Healey
5,832,550 A 11/1998 Hauger et al.
5,869,164 A 2/1999 Nickerson et al.
5,901,392 A 5/1999 Hsieh
5,966,754 A 10/1999 Schuster
5,966,763 A 10/1999 Thomas et al.
6,020,055 A 2/2000 Pearce
6,073,291 A 6/2000 Davis
6,110,006 A 8/2000 Chen
6,119,292 A 9/2000 Haas
6,128,796 A 10/2000 McCormick et al.
6,145,143 A 11/2000 Hicks et al.
6,151,739 A 11/2000 Meyer et al.
6,154,900 A 12/2000 Shaw
6,158,070 A 12/2000 Bolden et al.
6,175,980 B1 1/2001 Gaither
6,192,537 B1 2/2001 Miki
6,197,099 B1 3/2001 Pearce
6,209,159 B1 4/2001 Murphy
6,209,962 B1 4/2001 Sobel et al.
6,226,820 B1 5/2001 Navarro
6,254,959 B1 7/2001 Hirano et al.
6,318,372 B1 11/2001 Hiebert
6,327,724 B1 12/2001 Sharrock et al.
6,343,385 B1 2/2002 Katz
6,351,863 B1 3/2002 Meyer et al.
6,357,066 B1 3/2002 Pierce
6,381,787 B1 5/2002 Rogone et al.
6,397,419 B1 6/2002 Mechache
6,421,859 B1 7/2002 Hicks et al.
6,425,399 B1 7/2002 Hoster, Jr.
6,498,198 B2 12/2002 Pearce
6,499,166 B1 12/2002 Jones
6,588,511 B1 7/2003 Kriesel et al.
6,604,252 B1 8/2003 Lee et al.
6,701,544 B2 3/2004 Heimbrock
6,718,584 B2 4/2004 Rabaiotti et al.
6,823,549 B1 11/2004 Hampton et al.
6,857,151 B2 2/2005 Jusiak et al.
6,874,176 B2 4/2005 Berge
6,896,065 B2 5/2005 Kriesel et al.
6,986,170 B2 1/2006 Nelson
7,007,330 B2 3/2006 Kuiper et al.
7,020,912 B2 4/2006 Berge
7,032,261 B2 4/2006 Heimbrock
7,055,190 B2 6/2006 Barth et al.
7,065,815 B2 6/2006 Buchanan
7,080,422 B2 7/2006 Ben-Levi
7,114,204 B2 10/2006 Patrick
7,146,660 B2 12/2006 Heimbrock
7,200,956 B1 4/2007 Kotha et al.
7,240,384 B2 7/2007 DuDonis
7,243,382 B2 7/2007 Weedling et al.
7,266,852 B2 9/2007 Davis
7,340,785 B2 3/2008 Weedling et al.
7,360,543 B1 4/2008 Coleman et al.
7,415,738 B2 8/2008 Weedling et al.
7,424,760 B2 9/2008 Chaffee
7,464,422 B2 12/2008 Townsend
7,467,431 B2 12/2008 Weedling et al.
7,559,103 B2 7/2009 Barth et al.
7,565,710 B2 7/2009 Chambers et al.
7,591,029 B2 9/2009 Weedling et al.

(56) References Cited

U.S. PATENT DOCUMENTS

| | | | | |
|---|---|---|---|---|
| 7,650,654 | B2 | 1/2010 | Lambarth et al. | |
| 7,681,262 | B2 | 3/2010 | Weedling et al. | |
| 7,725,963 | B2 | 6/2010 | Johnson | |
| 7,739,758 | B2 | 6/2010 | Weedling et al. | |
| 7,832,039 | B2 | 11/2010 | Chambers et al. | |
| 7,900,299 | B2 | 3/2011 | Weedling et al. | |
| 7,904,971 | B2 | 3/2011 | Doria et al. | |
| 7,945,979 | B1 | 5/2011 | Lin | |
| 7,975,331 | B2 | 7/2011 | Flocard et al. | |
| 8,001,636 | B2 | 8/2011 | Nissen et al. | |
| 8,096,003 | B2 | 1/2012 | Schuster | |
| 8,171,585 | B2 | 5/2012 | Mead et al. | |
| 8,176,585 | B1 * | 5/2012 | Isham | A61G 13/123 5/710 |
| 8,191,188 | B2 | 6/2012 | Kaplan et al. | |
| 8,234,727 | B2 | 8/2012 | Schreiber et al. | |
| 8,261,388 | B1 | 9/2012 | Gill et al. | |
| 8,281,430 | B1 | 10/2012 | Hough et al. | |
| 8,302,222 | B2 | 11/2012 | Jasani | |
| 8,387,187 | B2 | 3/2013 | Hieronimi et al. | |
| 8,418,296 | B1 | 4/2013 | Hanlon et al. | |
| 8,555,440 | B2 | 10/2013 | Lewis | |
| 8,555,890 | B2 | 10/2013 | Hiebert | |
| 8,566,977 | B2 | 10/2013 | Davis | |
| 8,607,385 | B2 | 12/2013 | Isham | |
| 8,661,580 | B2 | 3/2014 | Giap | |
| 8,667,631 | B2 | 3/2014 | Coates | |
| 8,671,479 | B2 | 3/2014 | Huttner et al. | |
| 8,690,807 | B2 | 4/2014 | Hiebert | |
| 8,701,225 | B1 | 4/2014 | Latiff | |
| 8,756,725 | B2 | 6/2014 | Piegdon et al. | |
| 8,789,533 | B2 | 7/2014 | Steffens et al. | |
| 8,850,634 | B2 | 10/2014 | Ponsi et al. | |
| 8,858,478 | B2 | 10/2014 | Purdy et al. | |
| 8,898,833 | B2 | 12/2014 | Coates | |
| 8,984,681 | B2 * | 3/2015 | Ponsi | A61G 7/1026 5/81.1 R |
| 9,149,402 | B2 | 10/2015 | Gil Gomez et al. | |
| 9,375,343 | B2 | 6/2016 | Marshall et al. | |
| 9,445,933 | B2 | 9/2016 | Williams | |
| 9,504,621 | B2 | 11/2016 | Purdy et al. | |
| 9,782,313 | B2 | 10/2017 | Hindson | |
| 9,814,642 | B2 | 11/2017 | Purdy et al. | |
| 9,833,371 | B2 | 12/2017 | Purdy et al. | |
| 10,363,185 | B2 | 7/2019 | Purdy et al. | |
| 10,596,051 | B2 | 3/2020 | Purdy et al. | |
| 10,925,790 | B2 * | 2/2021 | Rodzewicz | A61G 7/1025 |
| 2002/0104535 | A1 | 8/2002 | Biondo et al. | |
| 2002/0144343 | A1 | 10/2002 | Kuiper et al. | |
| 2003/0192123 | A1 | 10/2003 | Chaffee | |
| 2003/0200611 | A1 | 10/2003 | Chaffee | |
| 2004/0083550 | A1 | 5/2004 | Graebe, Jr. | |
| 2005/0028273 | A1 | 2/2005 | Weedling et al. | |
| 2006/0037136 | A1 | 2/2006 | Weedling et al. | |
| 2006/0179577 | A1 | 8/2006 | Chaffee | |
| 2007/0083995 | A1 | 4/2007 | Purdy et al. | |
| 2007/0118993 | A1 | 5/2007 | Bates | |
| 2007/0283496 | A1 | 12/2007 | Skripps | |
| 2008/0083067 | A1 | 4/2008 | Wheeldon-Glazener | |
| 2008/0134442 | A1 | 6/2008 | Hui | |
| 2008/0201855 | A1 | 8/2008 | Groves | |
| 2008/0209630 | A1 * | 9/2008 | Kazala | A61G 1/01 5/81.1 T |
| 2009/0106893 | A1 | 4/2009 | Blevins | |
| 2009/0271928 | A1 | 11/2009 | Tishby | |
| 2010/0096419 | A1 | 4/2010 | Stephens | |
| 2010/0170037 | A1 | 7/2010 | Fletcher et al. | |
| 2011/0220695 | A1 | 9/2011 | Saunders et al. | |
| 2011/0241300 | A1 | 10/2011 | Schioler et al. | |
| 2011/0271444 | A1 | 11/2011 | Davis | |
| 2012/0011658 | A1 | 1/2012 | Weedling et al. | |
| 2012/0049605 | A1 | 3/2012 | Sanefuji et al. | |
| 2012/0079656 | A1 | 4/2012 | Lewis | |
| 2012/0186587 | A1 | 7/2012 | Steffens et al. | |
| 2012/0284923 | A1 | 11/2012 | Jensen et al. | |
| 2012/0311781 | A1 | 12/2012 | Purdy et al. | |
| 2012/0311787 | A1 | 12/2012 | Purdy et al. | |
| 2012/0311788 | A1 | 12/2012 | Jackson, II | |
| 2013/0061396 | A1 | 3/2013 | Lafleche et al. | |
| 2013/0145559 | A1 | 6/2013 | Purdy et al. | |
| 2013/0152950 | A1 | 6/2013 | Giap | |
| 2013/0180046 | A1 | 7/2013 | Davis, Jr. | |
| 2013/0198950 | A1 | 8/2013 | Purdy et al. | |
| 2013/0205495 | A1 | 8/2013 | Ponsi et al. | |
| 2013/0230685 | A1 | 9/2013 | Smith | |
| 2013/0276235 | A1 | 10/2013 | Kenalty et al. | |
| 2013/0340770 | A1 | 12/2013 | Starr et al. | |
| 2014/0007353 | A1 | 1/2014 | Stryker et al. | |
| 2014/0041114 | A1 | 2/2014 | Davis | |
| 2014/0075673 | A1 | 3/2014 | Weedling et al. | |
| 2014/0082836 | A1 * | 3/2014 | Patrick | A47C 27/081 5/81.1 HS |
| 2015/0052685 | A1 | 2/2015 | Bhat et al. | |
| 2015/0101126 | A1 | 4/2015 | Reiners et al. | |
| 2015/0128341 | A1 | 5/2015 | Kuiper et al. | |
| 2015/0135443 | A1 | 5/2015 | Cortez | |
| 2015/0157521 | A1 | 6/2015 | Williams et al. | |
| 2015/0238378 | A1 | 8/2015 | Bhat et al. | |
| 2015/0290848 | A1 | 10/2015 | Sanefuji et al. | |
| 2016/0067126 | A1 | 3/2016 | Purdy et al. | |
| 2016/0089291 | A1 * | 3/2016 | Tilk | A61G 7/1046 5/81.1 HS |
| 2018/0028381 | A1 | 2/2018 | Purdy et al. | |

FOREIGN PATENT DOCUMENTS

| | | | | |
|---|---|---|---|---|
| CN | 106687096 | | 5/2017 | |
| DE | 4447431 | | 6/1996 | |
| EP | 0821928 | | 2/1998 | |
| EP | 3038584 | | 7/2016 | |
| GB | 2300845 | | 11/1996 | |
| GB | 2484885 | | 5/2012 | |
| GB | 2484885 | A * | 5/2012 | A61G 1/01 |
| IN | 5020 | | 8/2007 | |
| JP | 58160035 | | 10/1983 | |
| WO | 0137774 | | 5/2001 | |
| WO | 2014043525 | | 3/2014 | |
| WO | 2015057775 | | 4/2015 | |
| WO | 2015128618 | | 9/2015 | |
| WO | 2015130703 | | 9/2015 | |
| WO | 2016037108 | | 3/2016 | |

OTHER PUBLICATIONS

PCT/IB2019/054348 , "International Preliminary Report on Patentability", Dec. 10, 2020, 9 pages.

"AirPal® Patient Air Lift", Hill-Rom®, retrieved from the internet at https://web.archive.org/web/20101015045524/http://www.hill-rom.com/usa/AirPal.htm, Oct. 15, 2010, 1 page.

"AirPal® Patient Air Lift", Hill-Rom®, retrieved from the internet at https://www.molnlycke.us/lurning-and-positioning-system/molnlycke-tortoise-turning-and-positioning-system/#confirm, Apr. 26, 2018, 4 pages.

"AIRPAL® Patient Transfer System", Hill-Rom®, http://www.discovermymobility.com/store/patient-lifts/hill-rom/hill-rom-patient-transfer-system.pdf, Dec. 22, 2008, 2 pages.

"AirSlide for Lateral Transfer in-Service Video", McAuley Medical, Inc., https://www.youtube.com/watchv=u0tjtK_4gOE, Mar. 14, 2009, 2 pages.

"EMS IMMOBILE-VAC™", retrieved from the internet at https://web.archive.org/web/20081120122715/http://www.mdimicrotek.com/prod_emsimmobilevac.htm MDI—Medical Devices International, Nov. 20, 2008, 5 pages.

"EZ Matt", EZ Way, Inc., retrieved from the internet at https://web.archive.org/web/20090202082654/http://ezlifts.com/products/product_details.cfmProductID=27, Feb. 2, 2009, 2 pages.

"Liftaem™—Revolutionary Lateral Patient Transfer Device", Smart Medical Technology, Inc.®, https://www.youtube.com/watchv=K7_9XA-dS5k, Apr. 4, 2008, 2 pages.

"Stryker Glide Lateral Air Transfer System", Stryker, https://www.stryker.com/stellent/groups/public/documents/web_content/glidespecsheetrevd.pdf, 2009, 2 pages.

(56) References Cited

OTHER PUBLICATIONS

"Stryker Glide Lateral Air Transfer System (Model 3062)", Stryker, Available online at https ://techweb.stryker.com/Stretcher/3062/3062-009-001 A. pdf., 2009, 31 pages.
U.S. Appl. No. 13/493,582 , "Amendment and Response", filed Aug. 17, 2016, 15 pages.
U.S. Appl. No. 13/493,582 , "Final Office Action", filed Jul. 11, 2016, 8 pages.
U.S. Appl. No. 13/493,582 , "Non-Final Office Action", filed Aug. 26, 2015, 10 pages.
U.S. Appl. No. 13/493,582 , "Non-Final Office Action", filed Feb. 29, 2016, 17 pages.
U.S. Appl. No. 13/493,582 , "Notice of Allowance", filed Sep. 2, 2016, 8 pages.
U.S. Appl. No. 13/493,641 , "Final Office Action", filed Nov. 7, 2016, 10 pages.
U.S. Appl. No. 13/493,641 , "Final Office Action", filed Aug. 2, 2017, 8 pages.
U.S. Appl. No. 13/493,641 , "Non Final Office Action", filed Mar. 16, 2017, 10 pages.
U.S. Appl. No. 13/493,641 , "Non-Final Office Action", filed Jun. 1, 2016, 15 pages.
U.S. Appl. No. 13/493,641 , "Non-Final Office Action", filed Sep. 9, 2015, 7 pages.
U.S. Appl. No. 13/493,641 , "Notice of Allowance", filed Sep. 26, 2017, 11 pages.
U.S. Appl. No. 13/834,911 , "Advisory Action", filed Jan. 9, 2017, 4 pages.
U.S. Appl. No. 13/834,911 , "Amendment and Response", filed Aug. 17, 2016, 14 pages.
U.S. Appl. No. 13/834,911 , "Final Office Action", filed Oct. 24, 2016, 16 pages.
U.S. Appl. No. 13/834,911 , "Non Final Office Action", filed Mar. 2, 2017, 19 pages.
U.S. Appl. No. 13/834,911 , "Non-Final Office Action", filed May 23, 2016, 15 pages.
U.S. Appl. No. 13/834,911 , "Non-Final Office Action", filed Aug. 25, 2015, 8 pages.
U.S. Appl. No. 13/834,911 , "Notice of Allowance", filed Jul. 31, 2017, 11 pages.
U.S. Appl. No. 14/845,062 , "Final Office Action", filed Nov. 30, 2017, 18 pages.
U.S. Appl. No. 14/845,062 , "Final Office Action", filed Aug. 10, 2018, 22 pages.
U.S. Appl. No. 14/845,062 , "Non-Final Office Action", filed Nov. 26, 2018, 12 pages.
U.S. Appl. No. 14/845,062 , "Non-Final Office Action", filed Feb. 9, 2018, 17 pages.
U.S. Appl. No. 14/845,062 , "Non-Final Office Action", filed Jun. 30, 2017, 20 pages.
U.S. Appl. No. 14/845,062 , "Notice of Allowance", filed Mar. 15, 2019, 9 pages.
U.S. Appl. No. 14/845,062 , "Restriction Requirement", filed May 30, 2017, 7 pages.
U.S. Appl. No. 15/730,268 , "Non-Final Office Action", filed Sep. 13, 2019, 12 pages.
U.S. Appl. No. 15/730,268 , "Notice of Allowance", filed Nov. 6, 2019, 12 pages.
U.S. Appl. No. 15/990,346 , "Non-Final Office Action", filed Apr. 1, 2020, 17 pages.
U.S. Appl. No. 15/990,346 , "Notice of Allowance", filed Oct. 7, 2020, 13 pages.
AU2015311732 , "First Examination Report", Sep. 27, 2017, 4 pages.
AU2015311732 , "Notice of Acceptance", Oct. 9, 2018, 3 pages.
AU2015311732 , "Second Examination Report", Mar. 10, 2018, 3 pages.
AU2015311732 , "Third Examination Report", Aug. 15, 2018, 4 pages.
Blue Chip Medical Products, Inc. , "Power Pro Elite® Mattress System—Model 9500", Retrieved from the internet at https://web.archive.org/web/20100501171106/http://www.bluechipmedical.com/mattresssystems/air-mattress/power-pro-elite, May 1, 2010, 4 pages.
BR112017004406-4 , "Office Action", Jul. 21, 2020, 4 pages.
CN201580047648.7 , "Notice of Decision to Grant", Apr. 9, 2020, 2 pages.
CN201580047648.7 , "Office Action", Mar. 5, 2019, 13 pages.
CN201580047648.7 , "Office Action", Dec. 24, 2019, 6 pages.
CN201580047648.7 , "Office Action", Aug. 20, 2019, 7 pages.
CN201580047648.7 , "Office Action", Sep. 3, 2018, 8 pages.
EP15837218.5 , "Extended European Search Report", Mar. 30, 2017, 9 pages.
EP15837218.5 , "Office Action", Apr. 6, 2018, 5 pages.
HOVERTECH , "HoverMatt® Air Transfer System", Retrieved from the internet at https://web.archive.org/web/20110208085745/http://www.hovermatt.com/reusable, Feb. 8, 2011, 1 page.
PCT/IB2019/054348 , "International Search Report and Written Opinion", Sep. 20, 2019, 13 pages.
PCT/US2015/048642 , "International Preliminary Report on Patentability", Mar. 16, 2017, 8 pages.
PCT/US2015/048642 , "International Search Report and Written Opinion", Dec. 2, 2015, 9 pages.
Sundance Enterprises, Inc. , "The DAP 210 Static Overlay Mattress", Healthcare Products, Retrieved from the internet at https://web.archive.org/web/20061014205929/http://sundancesolutions.com/dap210.php, Oct. 14, 2006, 2 pages.
Sundance Enterprises, Inc., "The DAP Series, Static Air Support System and Fluidized Positioners", Healthcare Products, retrieved from the internet at https://web.archive.org/web/20061013091949/http://sundancesolutions.com/healthcareproducts.php, Oct. 13, 2006, 1 page.

* cited by examiner

SYSTEM AND METHOD FOR PATIENT TURNING AND REPOSITIONING

CROSS REFERENCE TO RELATED APPLICATIONS

This application is a continuation of U.S. Ser. No. 15/990,346 filed May 25, 2018, titled "System and Method for Patient Turning and Repositioning," which application is a continuation-in-part of U.S. Ser. No. 15/730,268 filed Oct. 11, 2017, now U.S. Pat. No. 10,596,051, which is a continuation of Ser. No. 13/834,911 filed on Mar. 15, 2013, now U.S. Pat. No. 9,833,371, which is a continuation-in-part of application Ser. No. 13/493,582 filed on Jun. 11, 2012, now U.S. Pat. No. 9,504,621, which is a continuation of U.S. Ser. No. 13/493,641, filed on Jun. 11, 2012, now U.S. Pat. No. 9,814,642, which applications claim benefit of U.S. Provisional Application Ser. No. 61/614,791 filed on Mar. 23, 2012, U.S. Provisional Application Ser. No. 61/495,089 filed on Jun. 9, 2011, and U.S. Provisional Application Ser. No. 61/495,096 filed on Jun. 9, 2011, the entire contents of each of which are hereby incorporated by reference.

FIELD OF THE DISCLOSURE

The present disclosure relates to a patient support which can be used in a bed or flat surface and in particular to a system and method for support of the body, in particular in the prone position, which can also be used for turning and repositioning of a patient in a bed or on a flat surface. Features of the disclosure also relate to markings and other indicators used on the patient support which help guide caregivers in the proper use and correct patient positioning on the patient support.

BACKGROUND

Hospital bed and other patient static air and dynamic air supports are known. Typically, such patient supports are used to provide a support surface for patients or other individuals for treatment, recuperation, or rest and prevention of skin breakdown. It is desirable to provide an improved patient support for off-loading the patient in the prone position including bony prominences. In many instances, proper use of patient positioners is dependent upon caregiver training in the proper use of patient positioners, which can be inconsistent across hospitals and other facilities. Improvements are thus desired.

BRIEF SUMMARY

The present disclosure relates to a system and method for body support and off-loading. In many instances, it is optimal to barely elevate the body from the surface of the bed. In the prone position, the body is laying face forward towards the support surface. In other examples, the body may be lying face up away from the support surface. The system provides a support including a first ultra low pressure plenum and a positioner. In some examples, the positioner is positioned below the ultra low pressure plenum in order to adjust and control the amount of gas displaced therein. In other examples, the system provides a first ultra low pressure plenum, a second ultra low pressure plenum, and a positioner. Each of the ultra low pressure plenums can include one or more air chambers. Each air chamber is filled at a predetermined low pressure for distributing pressure along the length of the ultra low pressure plenum, but not providing significant elevation of a received body part by itself.

A cover can be received over the one or more ultra low plenums. The cover can include a retaining member for receiving the positioner. The cover can include a temperature regulating material for keeping the received body part in an optimal range of skin temperature to keep comfortable longer. In one embodiment, a phase change material can be used for adjusting the temperature of the system to adapt to temperature changes of the body.

In some embodiments, the positioner includes a bladder filled with a fluidized particulate material with sufficient size and shape to displace an amount of air in the support to offload pressure being from a received body part, such as, but not limited to, bony prominences of which contact a surface when the body is positioned in a prone position and when the body is turned to other positions. The surface area of the positioner provides greater positive air displacement in the ultra low pressure plenum(s) than would occur from the body part of the patient by itself In one embodiment, the positioner can have a greater width than the patient. In other embodiments, the positioner is sized and shaped to that of a small pillow. The positioner provides three dimensional movement. Preferably, the positioner has little or no flow characteristics unless an outside force is applied other than gravity. The positioner can displace and contour three dimensionally as though it was fluid while not having flow characteristics that would result in migration of the medium under the force of gravity. The positioner can provide three dimensional contouring. The positioner can be shaped as a pad.

In one embodiment, the first ultra low pressure plenum includes a lower bladder section having a smaller width dimension than an upper bladder section. The air chambers of the lower bladder section and the upper bladder section being in air communication with one another. Air is communicated within the upper bladder section and lower bladder section through air displacement. The patient body size and size and corresponding surface area of the positioner control the amount of air which is displaced evenly against the walls of the first ultra low pressure plenum. In some embodiments, a second ultra low pressure plenum is placed under the first ultra low pressure plenum. Alternatively, the second ultra low pressure plenum can be placed on top of the first ultra low pressure plenum. The second ultra low pressure plenum can have a size and shape identical or substantially similar to the upper bladder section of the first ultra low pressure plenum. The positioner is placed beneath or on top of both the first ultra low pressure plenum and the second ultra low pressure plenum or at other positions of the first ultra low pressure plenum and the second low pressure plenum or in combination one or more additional positioners. It has been found particularly useful to position the positioner below the lowest plenum, i.e., between the plenum and the support surface/hospital bed. In one embodiment, the positioner displaces air in one or both the first ultra low pressure plenum and the second ultra low pressure plenum to off-load the body. In one embodiment, the positioner can be positioned at one of outer walls of the first ultra low pressure plenum to push air away from the outer wall, thereby aiding in turning of a patient.

For example, the support can be used to allow a patient to be supported in the prone or supine position for off-loading the body from the collar bone to the knees to aid in treating advanced respiratory distress.

The combination of the first and second ultra low pressure plenums and positioner, including a fluidized medium, creates sufficient support of the received body part while responding to normal patient movement. The first and second ultra low pressure plenums can be low profile. This can mean that one or both plenums have a height of about only about one to about three inches above the support surface. In one embodiment, the system including the first and second ultra low pressure plenums can be positioned underneath the sheets of a bed, such as a hospital bed. Alternatively, the system including the first and second ultra low pressure plenums can be placed above the sheets for aiding in patient turning and repositioning.

Gripping handles can be provided on either edge of the first ultra low pressure plenum to aid in movement of the first ultra low pressure plenum when a patient supported by the first ultra low pressure plenum. In this embodiment, the gripping handles can be placed over the sheet and unweighted to allow the patient to be moved for turning and repositioning of the patient. In one embodiment, the gripping handles are holes in the cover. In an alternative embodiment, the gripping handles are placed under the sheet and have a high coefficient of friction to prevent movement of the ultra low pressure plenum.

In one example, there is provided a support system for a body part comprising: a plenum including a gas therein, said plenum configured to a shape to fit underneath a patient and support the lower back and hips of the patient, the plenum comprising: a series of markings indicating to a caregiver proper use of the plenum. The markings may comprise anatomical markings of a pelvis and vertebral column. In combination or in a different example, the markings may comprise guiding lines extending in lateral and longitudinal directions. In one example, the plenum comprises a main body and a lower extension, and the markings comprise tail markings illustrating how to tuck the lower extension underneath the main body. In combination or in a different example, the markings comprise an instructional pictogram containing one or more images illustrating proper use of the support system.

The system may also have a plurality of handles, with every other handle being a different color. There may be long gripping handles and shorter handles. It is possible to provide a positioner location marking positioned on a surface-facing side of the plenum. In combination or in a different example, there is provided a positioner adapted to be received beneath the plenum, wherein the positioner displaces said gas within the plenum.

The plenum may comprise an upper bladder and an extension bladder with the extension bladder has a smaller width diameter than the upper bladder. A bottom surface of the plenum may have a lower coefficient of friction than an upper surface. In combination or in a different example, the support system may be provided with a cover having a size to fit over the plenum, the cover including an extension adapted to be received over the extension bladder, an upper surface of the extension including a portion formed of a material having a higher coefficient of friction than other areas of the cover. The cover may include a plurality of handles attached adjacent edges of a rear surface of the cover.

There may also be provided a method of supporting a body part comprising the steps of: providing a patient support plenum comprising a main body and an extension, the plenum comprising (i) a series of markings indicating to a caregiver proper use of the plenum, (ii) a plurality of color-coded handles, and (iii) tail markings on the extension; reviewing the markings in order to determine appropriate patient positioning; positioning a patient on the support system using the markings as a guide; and (a) gripping handles for movement of the patient, (b) gripping handles for tucking the extension underneath the main body, or (c) both. In this method, the extension may have an upper surface with a higher coefficient of friction than a lower surface of the extension. It is also possible to position a positioner underneath the main body to displace gas within the plenum.

The invention will be more fully described by reference to the following drawings.

BRIEF DESCRIPTION OF THE DRAWINGS

FIG. 4 is a schematic diagram of the system including the positioner positioned at an outer wall of the support.

DETAILED DESCRIPTION

Figure 1A:
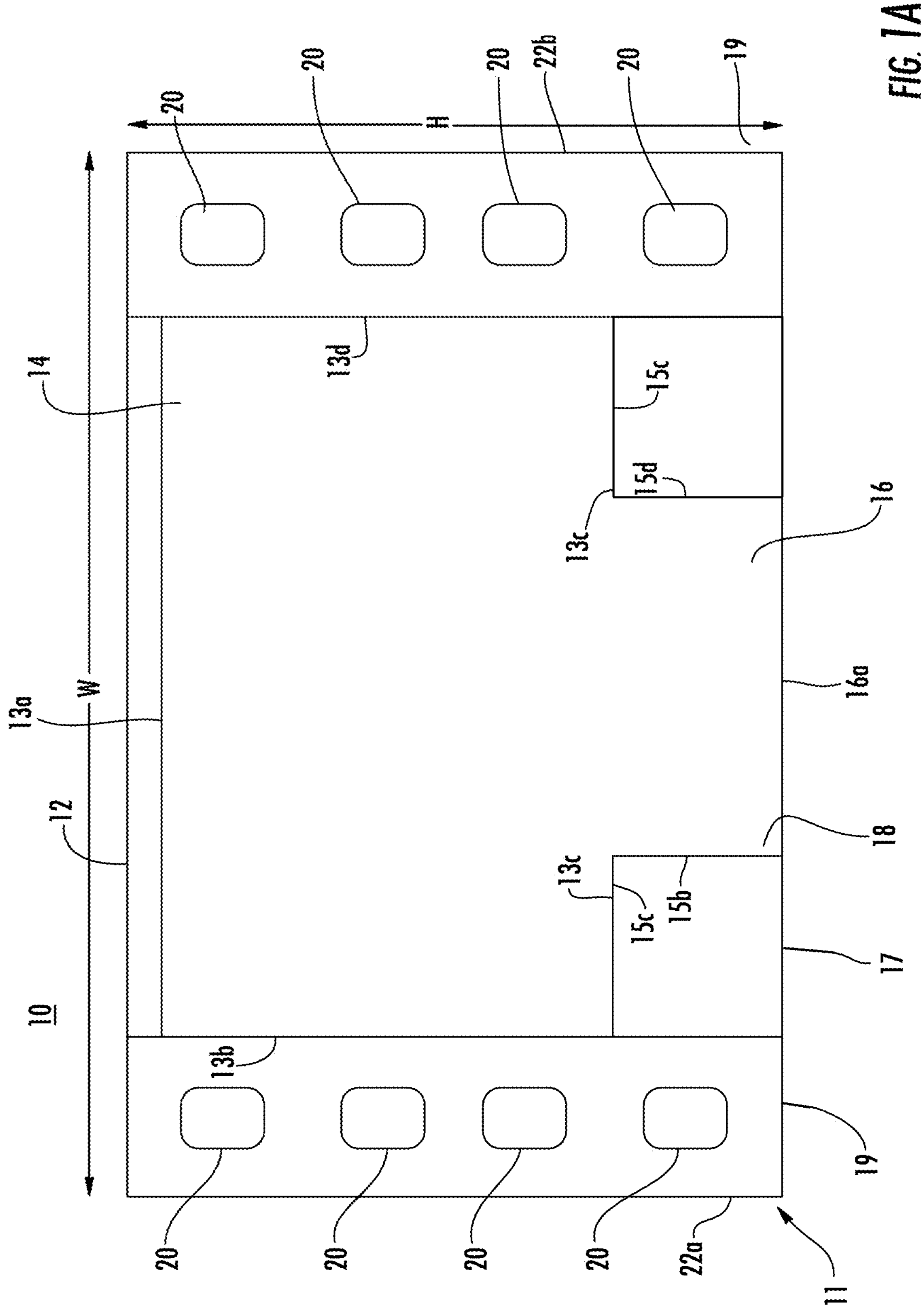
FIGS. 1A-1C are a schematic diagrams of a first bladder used in a system for body support in accordance with the teachings of the present invention.
Figure 1B:
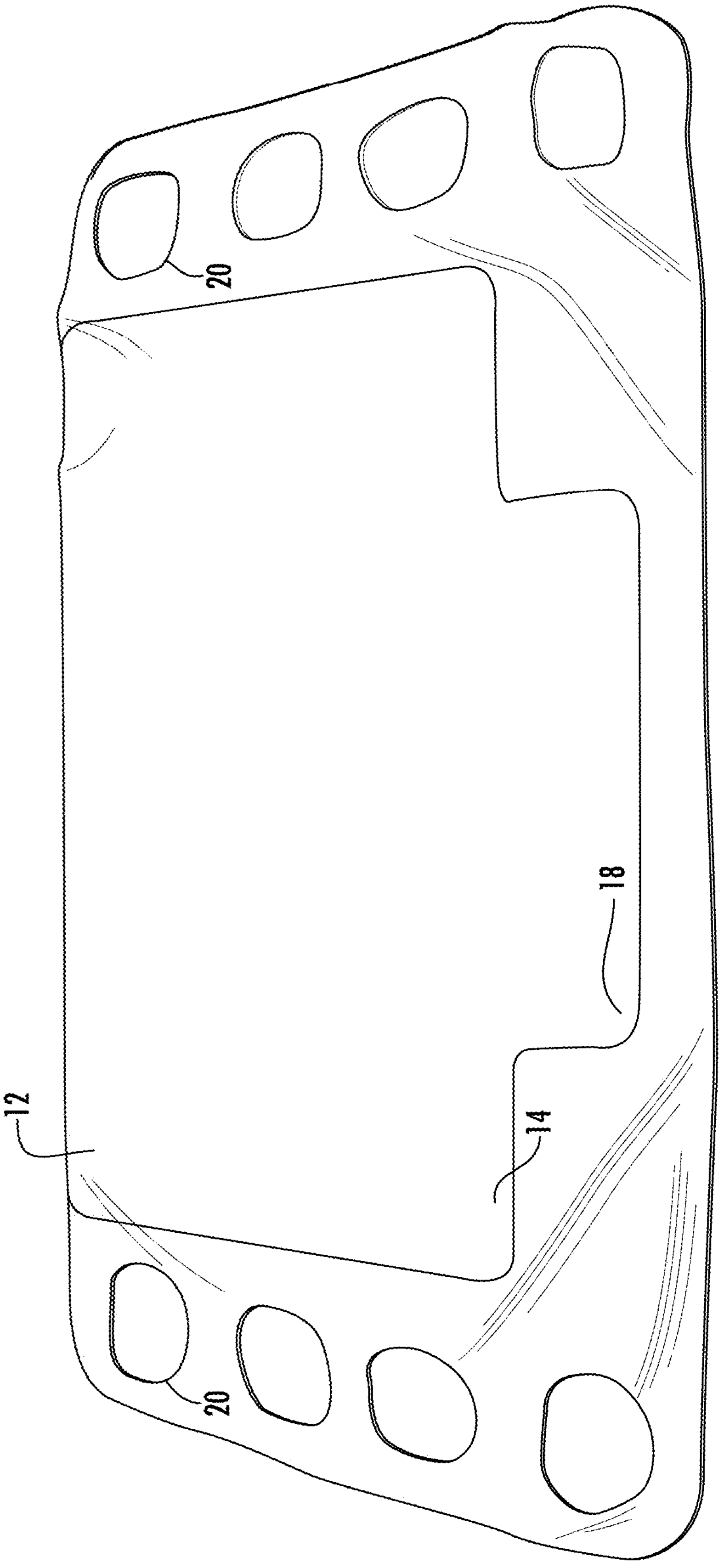
Figure 1C:
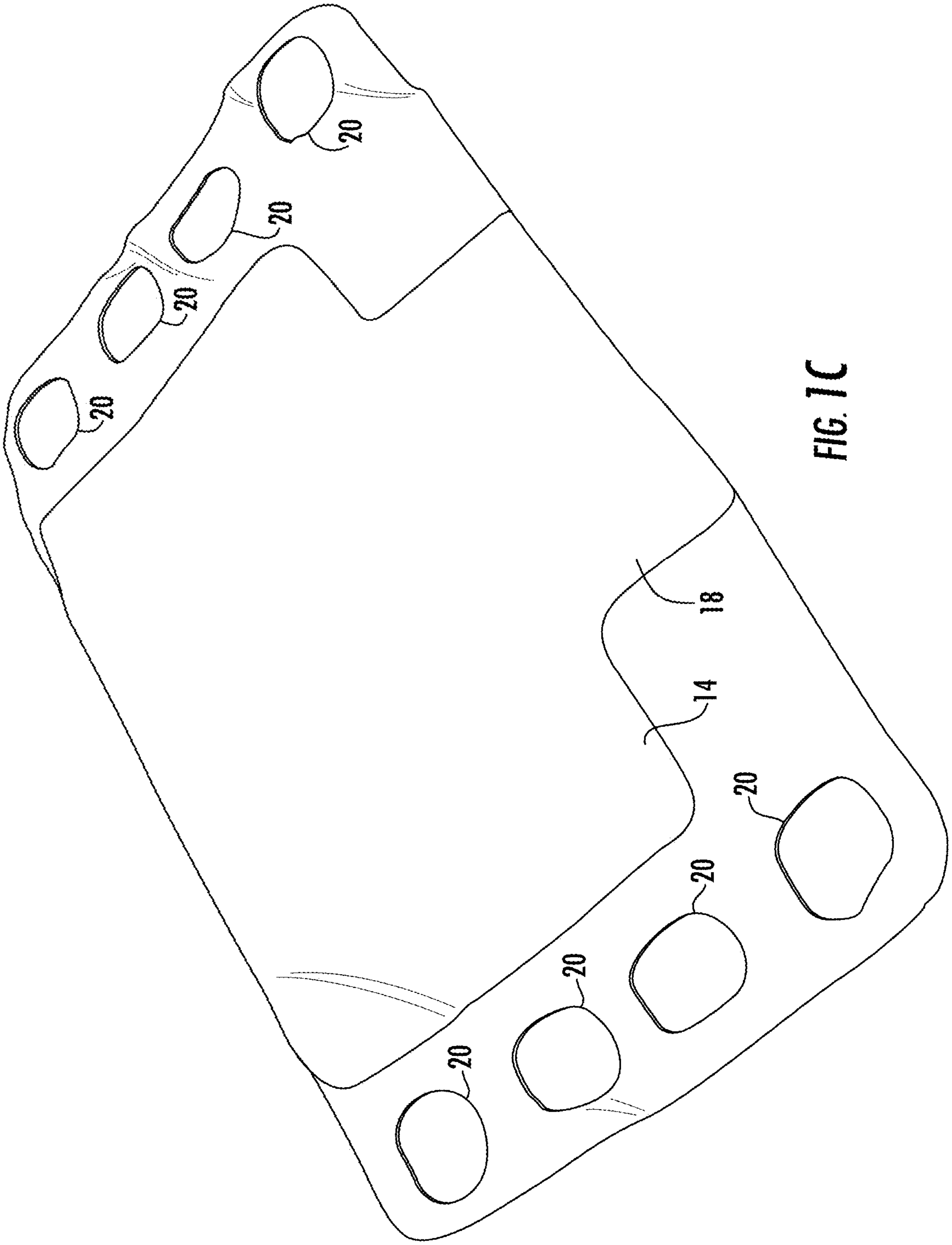

Reference will now be made in greater detail to a specific embodiment of the invention, an example of which is illustrated in the accompanying drawings. Wherever possible, the same reference numerals will be used throughout the drawings and the description to refer to the same or like parts.

FIGS. 1-4 illustrate system for support of a body part of a patient turning and repositioning of the patient with simultaneous offloading of the bony prominences 10 in accordance with the teachings of the present invention. The patient support system described herein may include a combination of plenums and positioners, in various combinations. A single low pressure plenum may be provided, or more than one plenum may be used in combination. A single positioner may be provided, or more than one positioner many be used in combination. First ultra low pressure plenum 12 is configured to a shape to fit underneath a patient and support the lower back and/or hips of a patient. For example, first ultra low pressure plenum 12 can have a width W1 of approximately 52 inches, and a height H1 of about 35 inches. Alternatively, width W1 can be a width of a bed, such as a hospital bed. As annotated by FIG. 4, first ultra low pressure plenum 12 is formed of upper bladder 14 and lower bladder 16. First upper bladder 14 can have a width W2 and height H2. Lower bladder 16 has a smaller width dimension W3 and height dimension H3 than upper bladder 14. Air pressure within upper bladder 14 and lower bladder 16 is reduced sufficiently for distributing pressure within first ultra low pressure plenum 12, but is not providing support of the received body part by itself. Upper bladder section 14 extends between edges 13*b* and 13*d*. In a specific example, the width between the edges 13*b* and 13*d* may be about 700 mm to about 1400 mm. In an even more specific example, the width may be about 950-1050 mm, or even more particularly, 997 mm. Lower bladder section 16 extends between edges 15*b* and 15*d*. In a specific example, the width between the edges 15*b* and 15*d* may be about 500 mm to about 1000 mm. In an even more specific example, the width may be about 900-850 mm, or even more particularly, 844 mm. Sizes in between these ranges are also considered within the scope of this disclosure. These dimensions are provided for perspective and description purposes only, and are not intended to be limiting.

Gripping handles 20 can be provided on either edge 22*a*, 22*b* to aid in movement of first ultra low pressure plenum 12 over surface 19. Gripping handles 20 can be placed over a sheet of a bed and unweighted to allow the patient to be moved. In an alternative embodiment, gripping handles 20 are placed under the sheet and have a high coefficient of friction to prevent movement of first ultra low pressure plenum 12.

Figure 2:
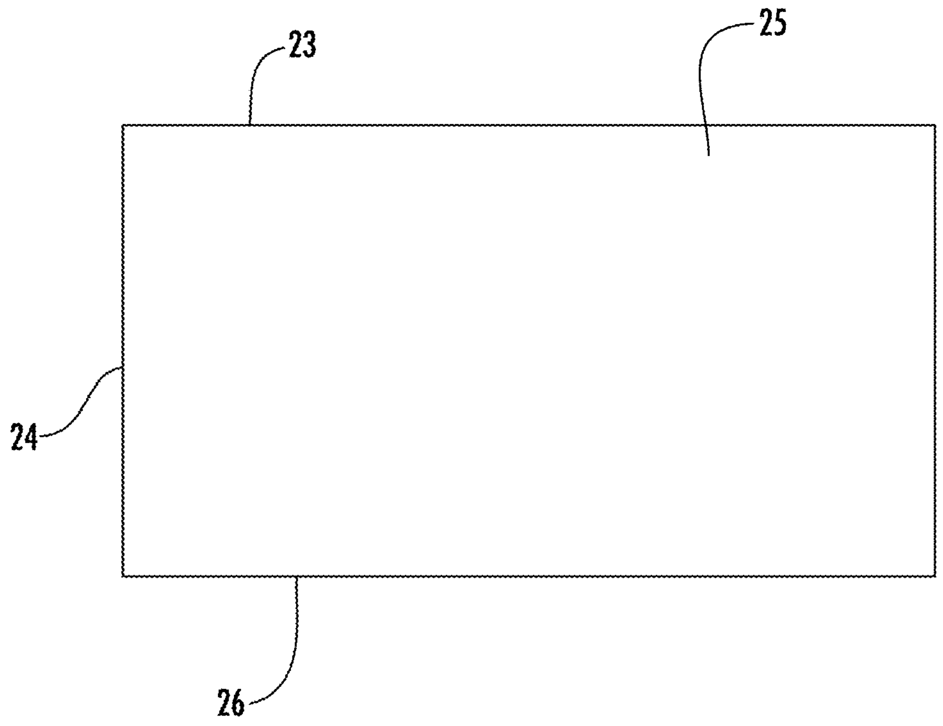
FIG. 2 is a schematic diagram of a positioner used in the system.

Positioner 23 can include bladder 24, as shown in FIG. 2. Bladder 24 is filled with fluidized material 25 which can retain its shape after sculpting. The flowability or lubricity of fluidized material 25 can be increased by adding a lubricant or by the removal of air from the interstitial spaces or both. The preferred medium of fluidized material 25 is a particulate material that has been modified in such a way that it acts like a fluid. Fluidized material 25 refers to a compound or composition which can be sculpted and retain its shape and has no memory or substantially no memory. The no memory or substantially no memory feature enables bladder 24 to increase in height and maintain support of a body part. Fluidized material 25 is made of a viscosity that will allow it to contour but not collapse under the weight of the body part.

At sea level, the normal interstitial air pressure would exceed about 760 millibars of mercury. This increases or decreases marginally as altitude varies. Depending on the nature of the particulate fluidized material 25, the pressure can be lowered below about 500 millibars to about 5 millibars, preferably, 350 millibars to about 5 millibars, while still maintaining the necessary flow characteristics of the product.

Fluidized material 25 can include compressible and non-compressible beads, such as polyethylene or polystyrene (PS) beads, expanded polyethylene (PE), crosslinked expanded polyethylene (PE), polypropylene (PP) pellets, closed cell foams, microspheres, encapsulated phase changing materials (PCM). The beads can be hard shelled or flexible. In one embodiment, the beads are flexible and air can be evacuated from the beads. In one embodiment, hard beads can be mixed with flexible beads in which air can be evacuated from the flexible beads. In an alternative embodiment, fluidized material 25 can a porous foam substance including pockets of interstitial air. In one embodiment, fluidized material 25 can be a polyurethane foam. The polyurethane foam can be open or closed cell and cut into small shapes such as spheres or blocks. For example, a sphere of polyurethane foam can have a size of 2 inches in diameter. For example, a block of polyurethane foam can be a 1×1×1 inch block.

Suitable examples of fluidized material 25 can be formed of a mixture of microspheres and lubricant. The microspheres can include hollow or gas-filled structural bubbles (typically of glass or plastic) with an average diameter of less than 200 microns. The composition flows and stresses in response to a deforming pressure exerted on it and the composition ceases to flow and stress when the deforming pressure is terminated. For example, fluidized material 25 can be formed of a product referred to as Floam™. A flowable compound comprising lubricated microspheres, including the compound itself, formulations for making the compound, methods for making the compound, products made from the compound and methods for making products from the compound as defined by U.S. Pat. Nos. 5,421,874, 5,549,743, 5,626,657, 6,020,055, 6,197,099 and 8,175,585, each of which is hereby incorporated by reference into this application.

For example, bladder 24 can be formed of a flexible plastic, such as urethane. Upon removal of gas from fluidized material 25, bladder 24 flows concurrent with the flow of fluidized material 25 such that bladder 24 moves with movement of fluidized material 25. For example, the gas can be air, helium, hydrogen or nitrogen. Optionally, gas can communicate throughout the whole bladder for allowing maximum contouring and functional displacement of both the gas and the fluidized chamber thereby providing maximum contouring to a desired body part. In a specific example, the dimensions of the bladder 24 may range from about 400 mm×about 200 mm to about 900 mm×about 600 mm. Sizes in between these ranges are also considered within the scope of this disclosure. These dimensions are provided for perspective and description purposes only, and are not intended to be limiting.

Figure 3:
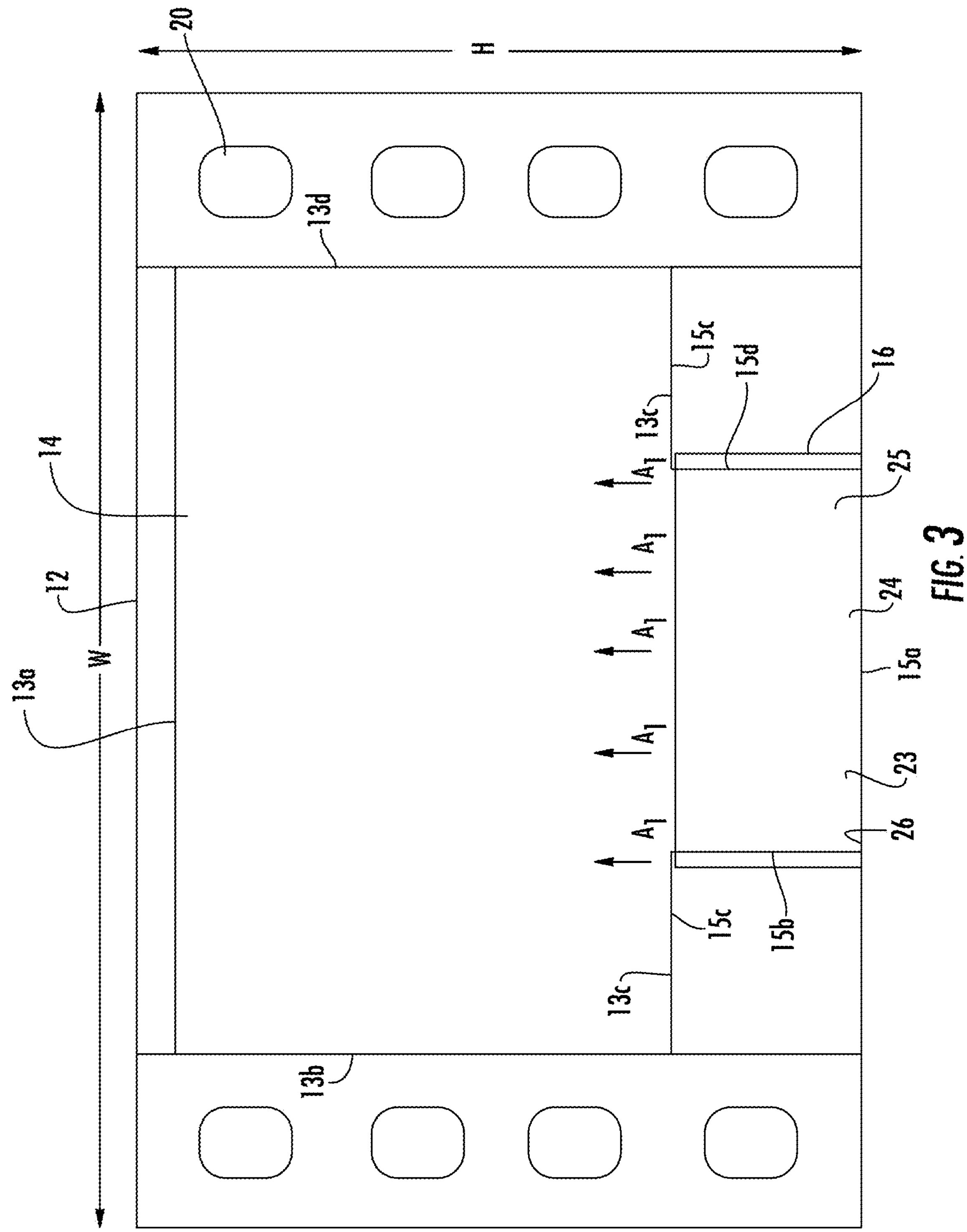
FIG. 3 is a schematic diagram of a second bladder used in the system.

FIG. 3 is a schematic diagram of second ultra low pressure plenum 32. Second ultra low pressure plenum 32 is formed of bladder 34. Second ultra low pressure plenum 32 can have a width W4 and a height H4 that is identical or substantially similar to height H2 and width W2 of upper bladder 14 of the first ultra low pressure plenum 12.

Figure 4:
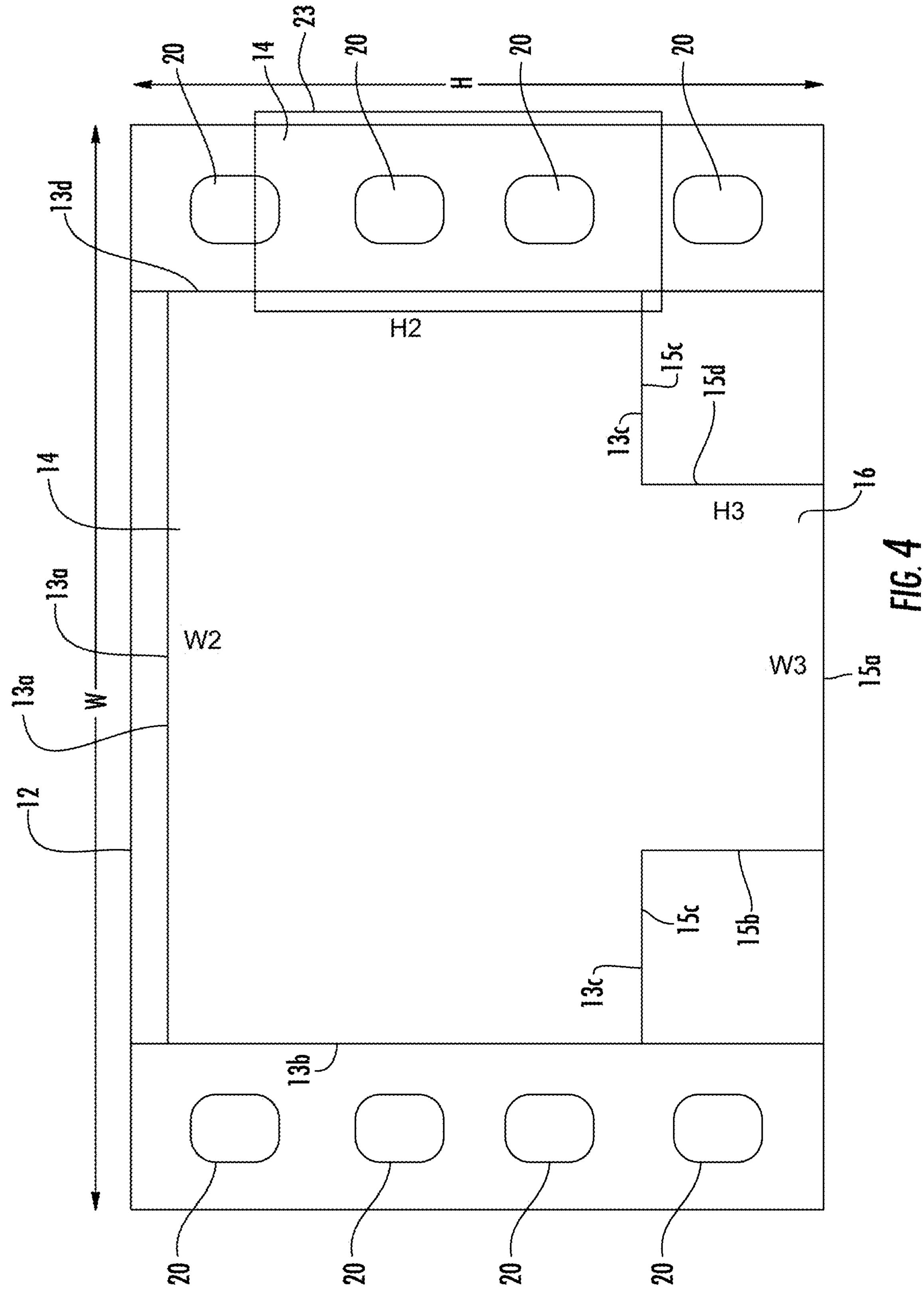
FIG. 4 is a schematic diagram of the system including the first and second bladders and the positioner.

Second ultra low pressure plenum 32 can be placed under first ultra low pressure plenum 12 as shown in FIG. 4. Alternatively, the second ultra low pressure plenum can be placed on top of the first ultra low pressure plenum. Positioner 23 is placed beneath both the first ultra low pressure plenum 12 and second ultra low pressure plenum 32. Positioner 23 displaces air in both the first ultra low pressure plenum 12 and second ultra low pressure plenum 32. Lower surface 26 of positioner 23 can be formed of a high friction material for preventing movement of positioner 23.

Bladder 24 is preferably filled with fluidized particulate material 25 with sufficient size and shape to displace an amount of gas in ultra low pressure plenum 12 and second ultra low pressure plenum 32 to offload pressure from the received body part, such as the bony prominences of the collar bone, rib cage and iliac crest when the body is in the prone position adjacent system 10. In other examples, the system offloads bony prominences of head, shoulder blades, elbows, heels, pelvis, or other bony portions of a patient's anatomy. Bladder 24 provides micro-contouring because fluidized material 25 can respond three-dimensionally. Alternatively, bladder 24 is formed of any contouring medium, such as foam or gel which is sufficient to displace air within first ultra low pressure plenum 12 and second ultra low pressure plenum 32.

For example, the pressure in ultra low pressure plenum 12 and second ultra low pressure plenum 32 can be below 20 mm of water. It will be appreciated that all equivalents such as mm Hg and PSI can be used for measuring the pressure within ultra low pressure plenum 12 and second ultra low pressure plenum 32.

The pressure within ultra low pressure plenum 12 and second ultra low pressure plenum 32 can be below about 20 mm of water if no positioner 23 is used or if an area of less than about 30% of ultra low pressure plenum 12 and second ultra low pressure plenum 32 are covered by positioner 23. The pressure within ultra low pressure plenum 12 and second ultra low pressure plenum 32 can be below about 10 mm of water if an area of between about 30% to about 60% of ultra low pressure plenum 12 and second ultra low pressure plenum 32 is covered by positioner 23. The pressure within ultra low pressure plenum 12 and second ultra low pressure plenum 32 can be below about 5 mm of water if an area of greater than about 60% of ultra low pressure plenum 12 and second ultra low pressure plenum 32 are covered by positioner 23.

Bottom surface 17 of first ultra low pressure plenum 12 or second ultra low pressure plenum 32 can be formed of a material having a low coefficient of friction to be used to move a patient on surface 19 underneath first ultra low pressure plenum 12 or second ultra low pressure plenum 32. A suitable material having a low coefficient of friction is nylon or rip stop nylon material. Upper surface 18 of first ultra low pressure plenum 12 or second ultra low pressure plenum 32 can be formed of a material having a high coefficient of friction. A suitable material having a high coefficient of friction is a rubberized or non-skid material.

An additional positioner 23 can be placed over lower bladder 16 of ultra low pressure plenum 12 to displace gas from lower bladder 16 to upper bladder 14 in the direction of arrows $A_1$, as shown in FIG. 4 or at various locations on first ultra low pressure plenum 12 or second ultra low pressure plenum 32. When a patient is recumbent on first ultra low pressure plenum 12 and second ultra low pressure plenum 32 gas will be displaced in upper bladder 14 and second ultra low pressure plenum 32. towards outer edges 13*a* for providing support adjacent to edges 13*b* and 13*d* thereby providing support of edges 13*b* and 13*d* of upper bladder 14 of the patient within edges 13*b* and 13*d* and to the edges of bladder 34 for lifting a patient from surface 11.

Figure 5:
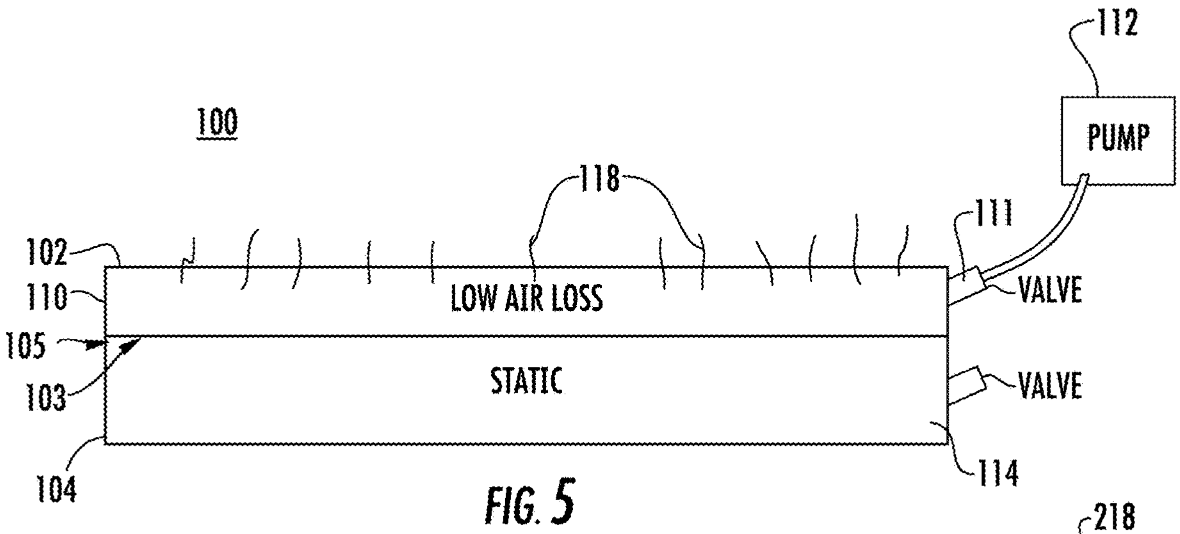
FIG. 5 is a schematic diagram of an alternate embodiment of a system for support of a body part in accordance with the teachings of the present invention which provides low pressure loss.

In one embodiment, positioner 23 can be positioned at one of edges 13*b* and 13*d* to push air away from respective edges 13*b* and 13*d* thereby aiding in turning of a patient towards the opposite edge, as shown in FIG. 5. For example, if the patient is to be turned towards edge 13*d*, positioner 23 can be placed at edge 13*b* for displacing gas behind the patient to towards edge 13*b* of upper bladder 14, thereby pneumatically assisting in turning of the patient to face edge 13*d*.

System 10 including ultra low pressure plenum 12 and second ultra low pressure plenum 32 is functional whether positioner 23 is placed on top of ultra low pressure plenum 12 and second ultra low pressure plenum 32 or beneath ultra low pressure plenum 12 and second ultra low pressure plenum 32.

Figure 6:
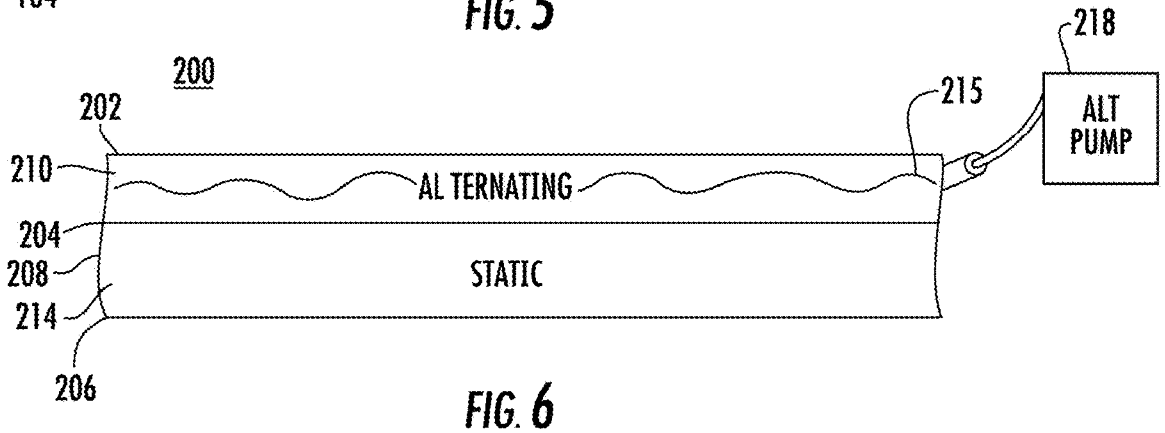
FIG. 6 is a schematic diagram of an alternate embodiment of a system support of a body part in accordance with the teachings of the present invention which provides alternating pressure.

FIGS. 6-17 illustrate system for support of a body part of a patient turning and repositioning of the patient with simultaneous offloading of the bony prominences 300 in accordance with the teachings of the present invention. System 300 includes first ultra low pressure plenum 312 and second low pressure plenum 332, as shown in FIG. 6. First ultra low pressure plenum 312 is configured to a shape to fit underneath a patient and support the lower back and/or hips of a patient. First ultra low pressure plenum 312 can include upper bladder 314 and extension bladder 315. Extension bladder 315 extends from upper bladder 314. Extension bladder 315 and upper bladder 314 can be integral to one another. Air pressure within upper bladder 314 and extension bladder 315 is reduced sufficiently for distributing pressure within first ultra low pressure plenum 312, but is not providing support of the received body part by itself. Second ultra low pressure plenum 332 is formed of bladder 334. Second ultra low pressure plenum 32 can be placed under first ultra low pressure plenum 12. Dimples 311 can be formed in first ultra low pressure plenum 312 and dimples 331 can be formed in second ultra low pressure plenum 332. Dimples 311 and dimples 331 can be aligned with one another.

Figure 7:
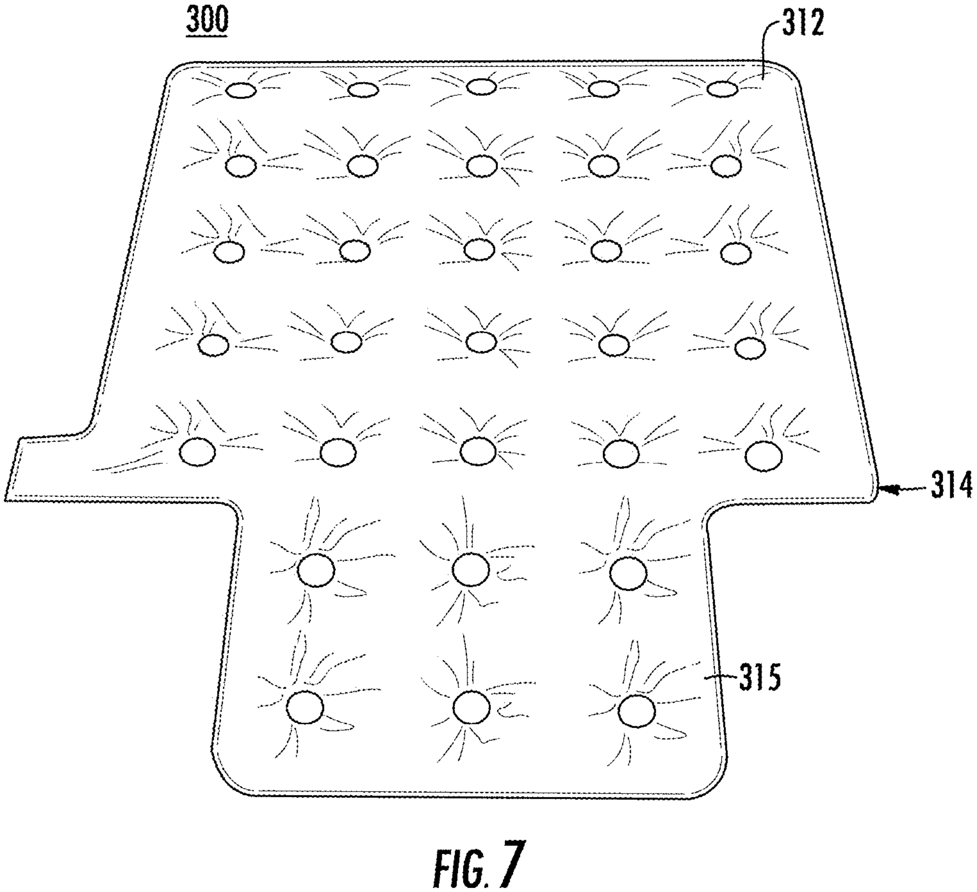
FIG. 7 is a schematic diagram of a support used in an alternate embodiment of a system for sacral and trochanteric support in accordance with the teachings of the present invention.
Figure 8:
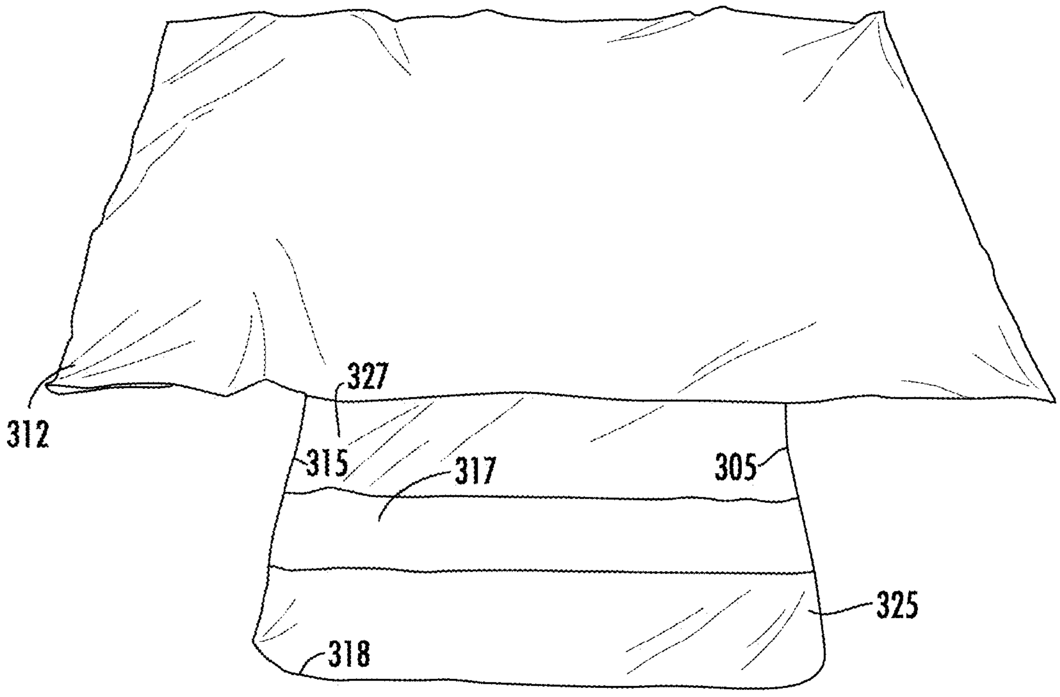
FIG. 8 is a front view of a cover placed over the support shown in FIG. 7.
Figure 9:
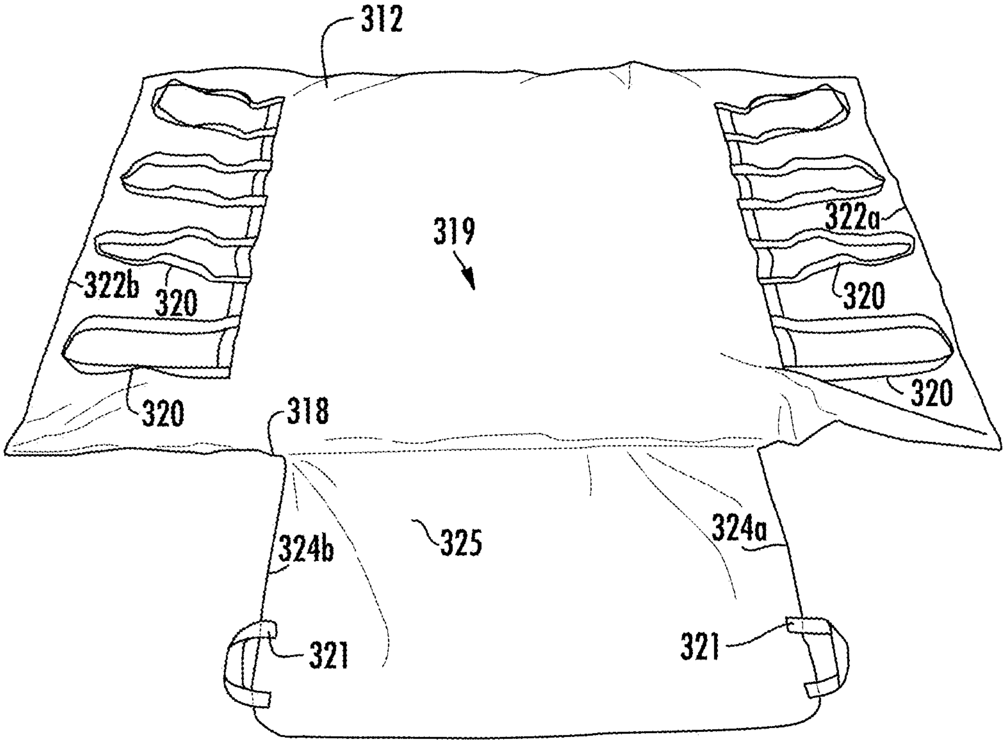
FIG. 9 is a rear view of a cover placed over the support shown in FIG. 7.

Cover 318 can be placed around first ultra low pressure plenum 312 and second ultra low pressure plenum, as shown in FIGS. 7-9. Cover 318 can be formed of a material having a low coefficient of friction. A suitable material having a low coefficient of friction is nylon or rip stop nylon material. Extension 325 of cover 318 receives extension bladder 315.

Portion 317 on upper surface 327 of extension 325 can be formed of a material having a high coefficient of friction. A suitable material having a high coefficient of friction is a rubberized or non-skid material. Portion 317 can be folded underneath rear surface 319 of upper bladder 314 to prevent movement of ultra low pressure plenum 312, as shown in FIG. 9. Handles 320 can be provided adjacent either edge 322*a*, 322*b* of cover 318 to aid in movement. Handles 321 can be provided adjacent either edge 324*a*, 324*b* of extension 325 of cover 318 to aid in folding of extension 325 underneath rear surface 319.

Figure 10:
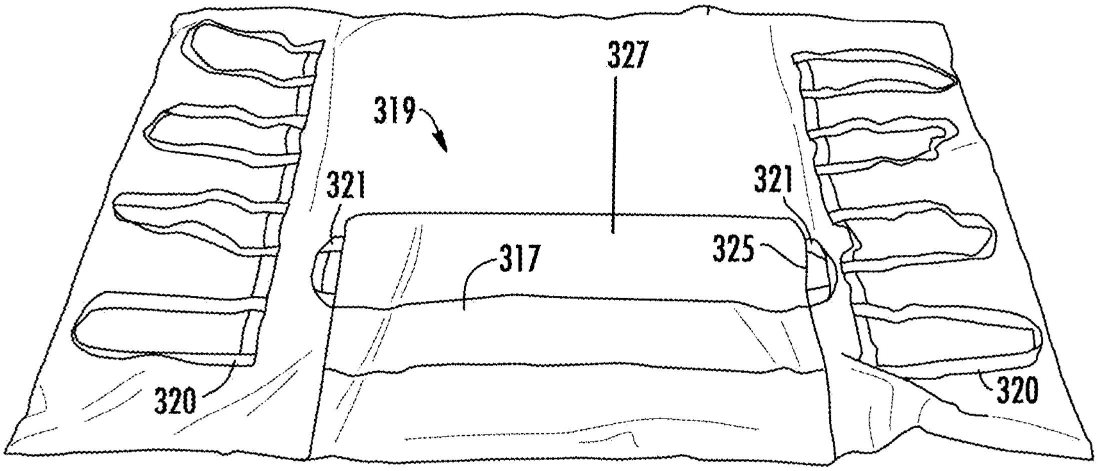
FIG. 10 is a rear view of a cover placed over the support shown in FIG. 7 including an extension of the support placed in a folded condition.
Figure 11:
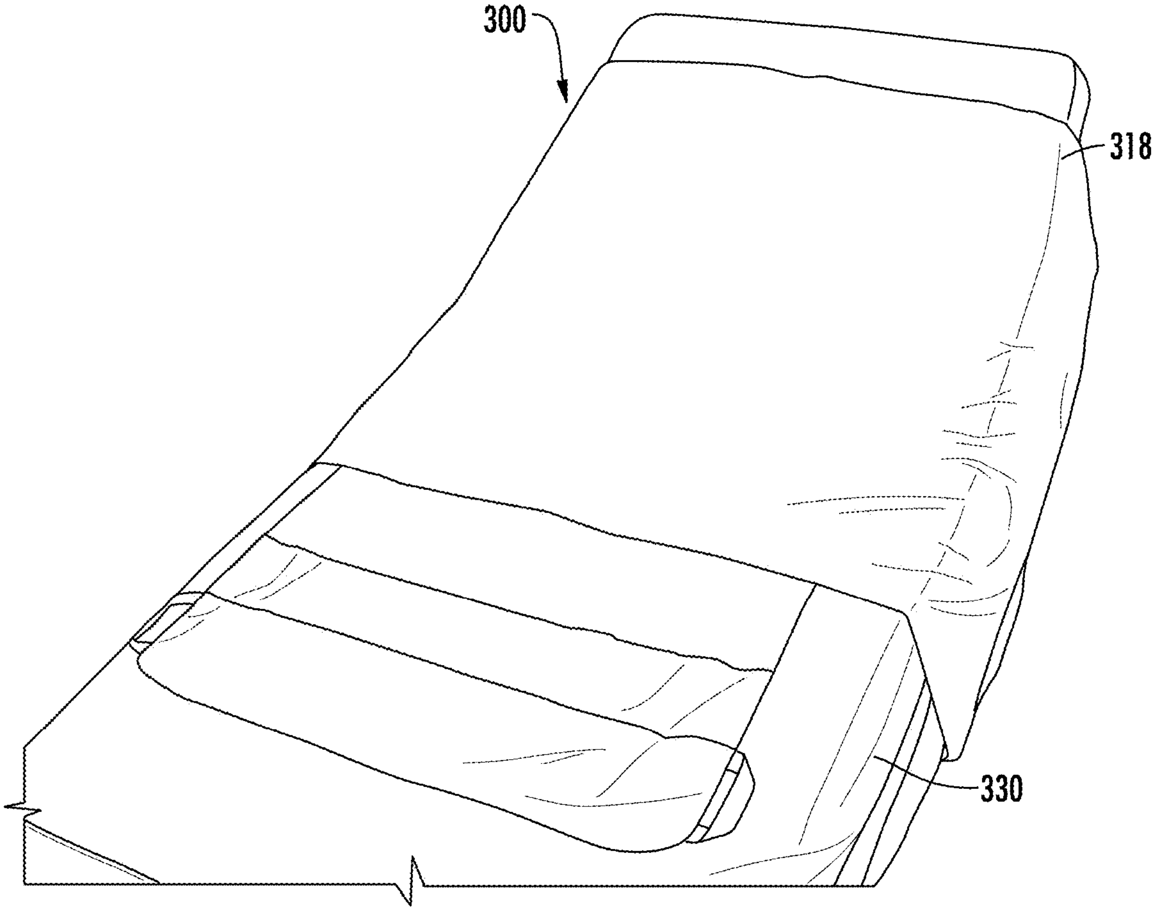
FIG. 11 is a schematic diagram of the system for sacral and trochanteric support in accordance with the teachings of the present invention when placed on a bed.

FIGS. 10-17 illustrate use of system for support of a body part of a user turning and repositioning of the user with simultaneous offloading of the bony prominences 300. In FIG. 10, system for support of a body part of a user turning and repositioning of the user with simultaneous offloading of the bony prominences 300 can be placed on bed 330. System 300 can be moved to different positions on bed 330 using handles 320, as shown in FIG. 11.

Figure 12:
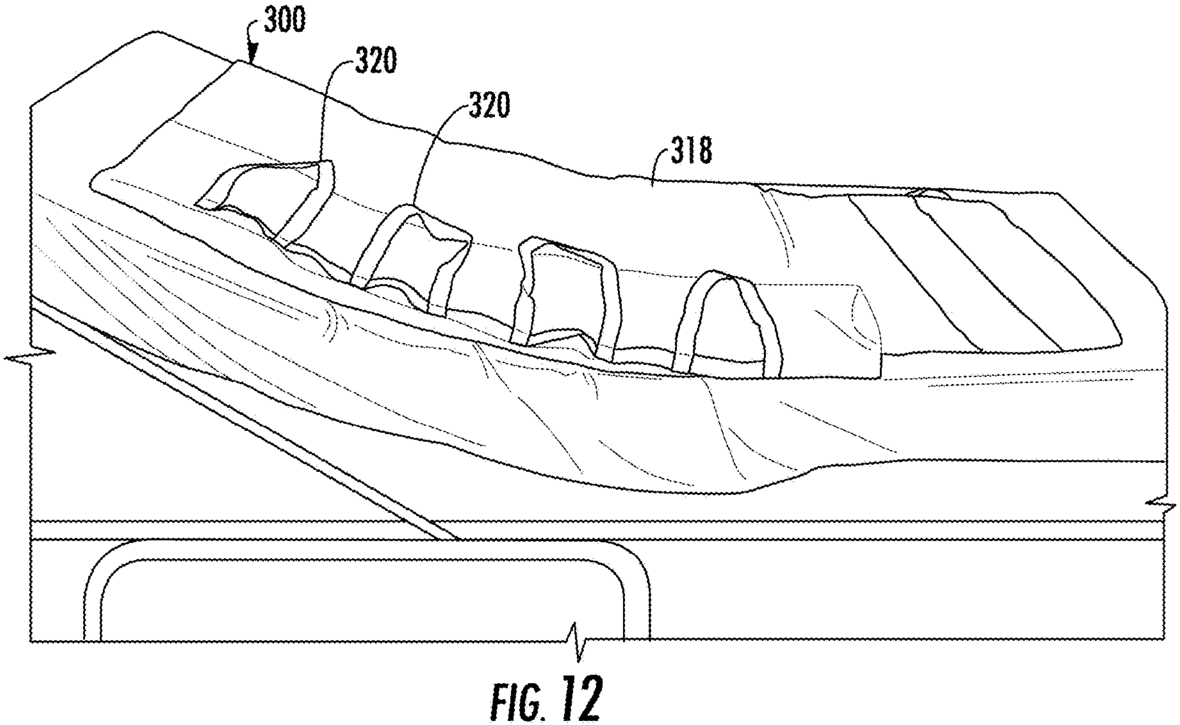
FIG. 12 is a schematic diagram of the system for sacral and trochanteric support in accordance with the teachings of the present invention when placed on a bed and having one side folded to expose handles attached to a rear side of the support.
Figure 13:
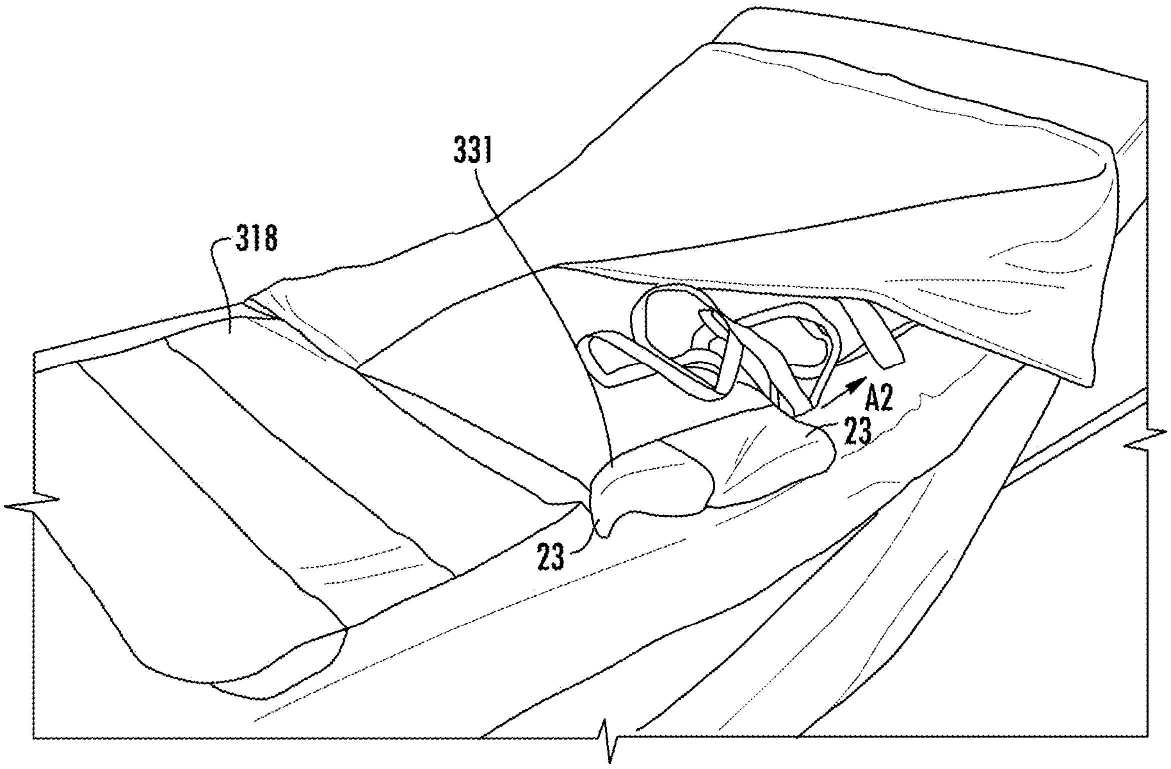
FIG. 13 is a schematic diagram of the system for sacral and trochanteric support in accordance with the teachings of the present invention when placed on a bed and including a positioner placed in a retainer of the cover.
Figure 14:
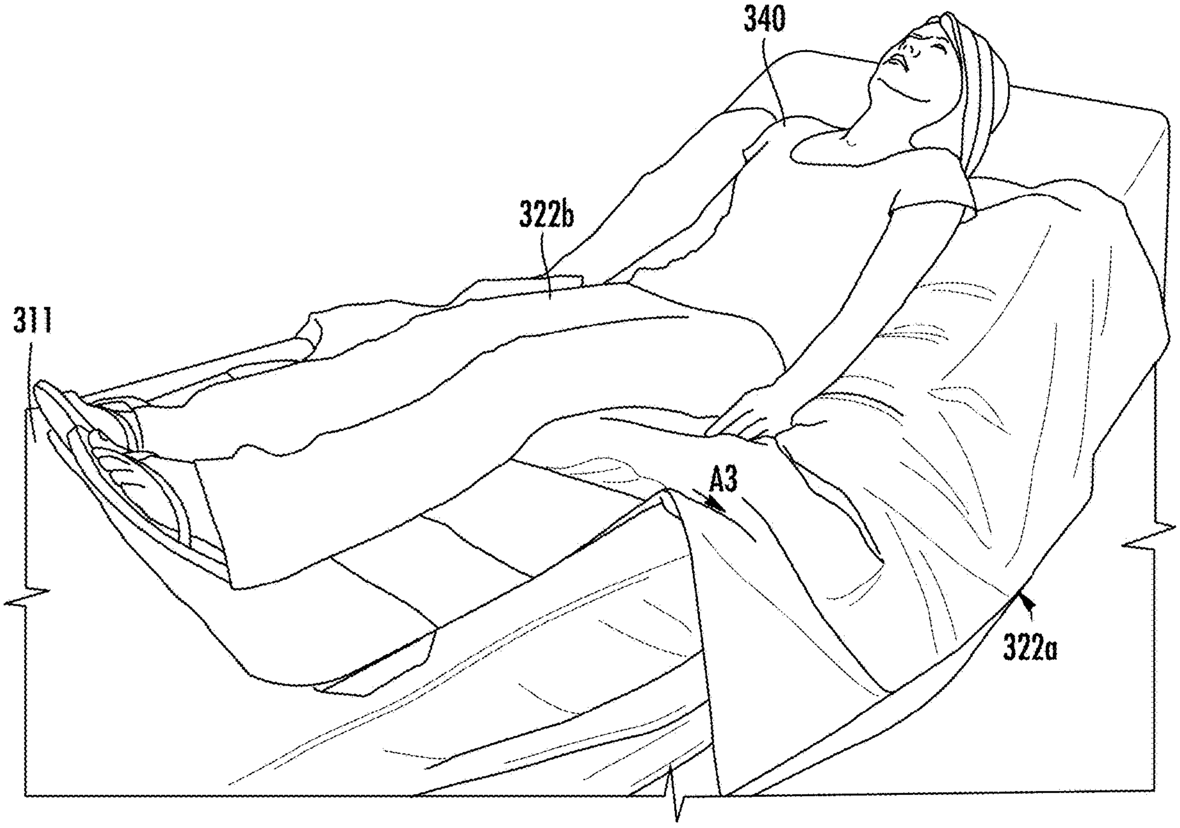
FIG. 14 is a schematic diagram of the system for sacral and trochanteric support in accordance with the teachings of the present invention when placed on a bed and in use by a user.
Figure 15:
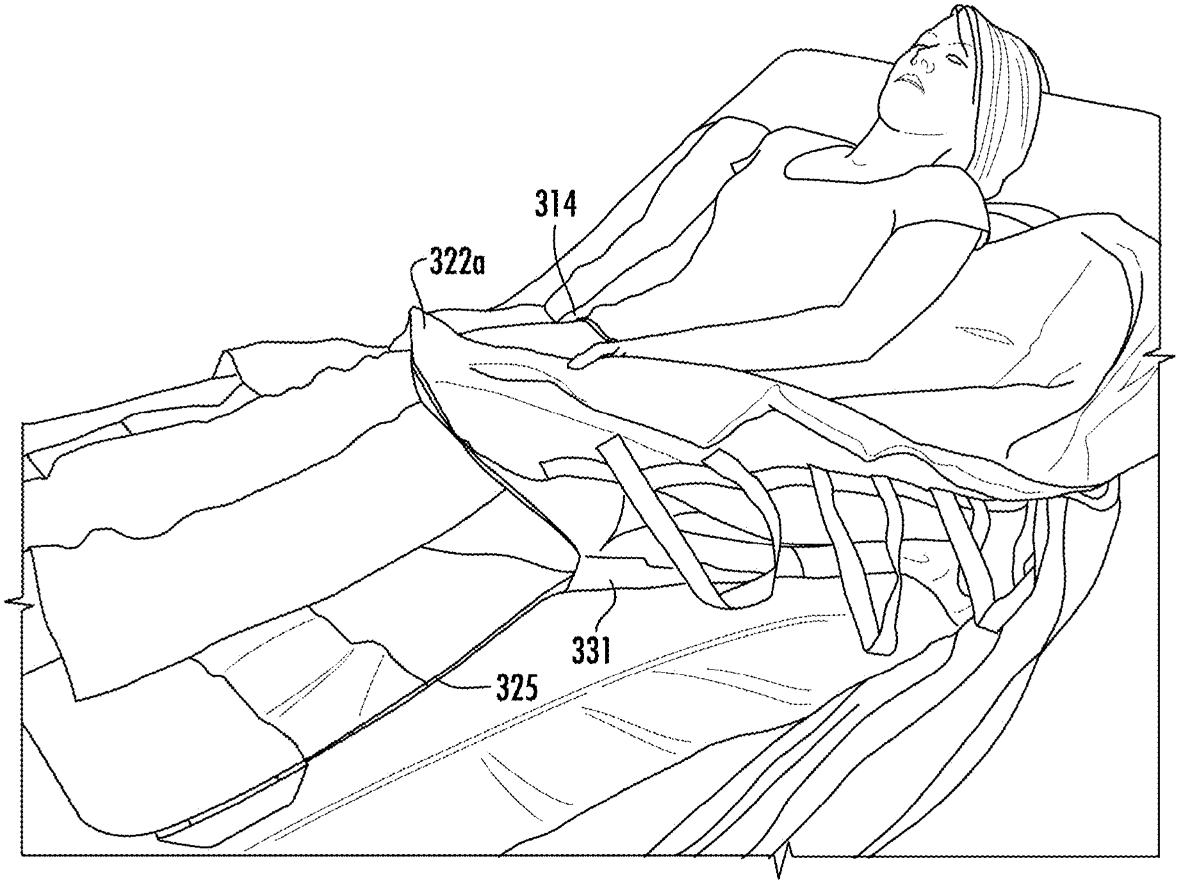
FIG. 15 is a schematic diagram of the system for sacral and trochanteric support in accordance with the teachings of the present invention when placed on a bed and in use by a user during folding of an edge towards the user.

Positioner 23 can be placed within pocket 331 of cover 318 to retain positioner 23. Positioner 23 can be placed over upper bladder 314 of first ultra low pressure plenum 312 to displace gas in the direction of arrow $A_2$, as shown in FIG. 12. When a user is recumbent on first ultra low pressure plenum 312 with their sacrum received on positioner 23, gas will be displaced in upper bladder 314 in the direction of arrow $A_3$ towards outer edges 322*a*, 322*b* for providing support adjacent to edges 322*a* and 322*b* thereby providing support of the user within edges 322*a* and 322*b* and lifting user 340 from surface 311 of bed 330 and offloading the sacrum and trochanter of user 340, as shown in FIG. 13 and allow the body to be rotated over the support or bed. Additional positioners 23 can be placed in pocket 331 of cover 118 by lifting edge 322*a* to provide additional displacement of gas within upper bladder 314 as shown in FIG. 14. Extension 325 can be folded underneath rear surface 319 of upper bladder 314 to prevent movement of ultra low pressure plenum 312, as shown in FIG. 15.

Figure 16:
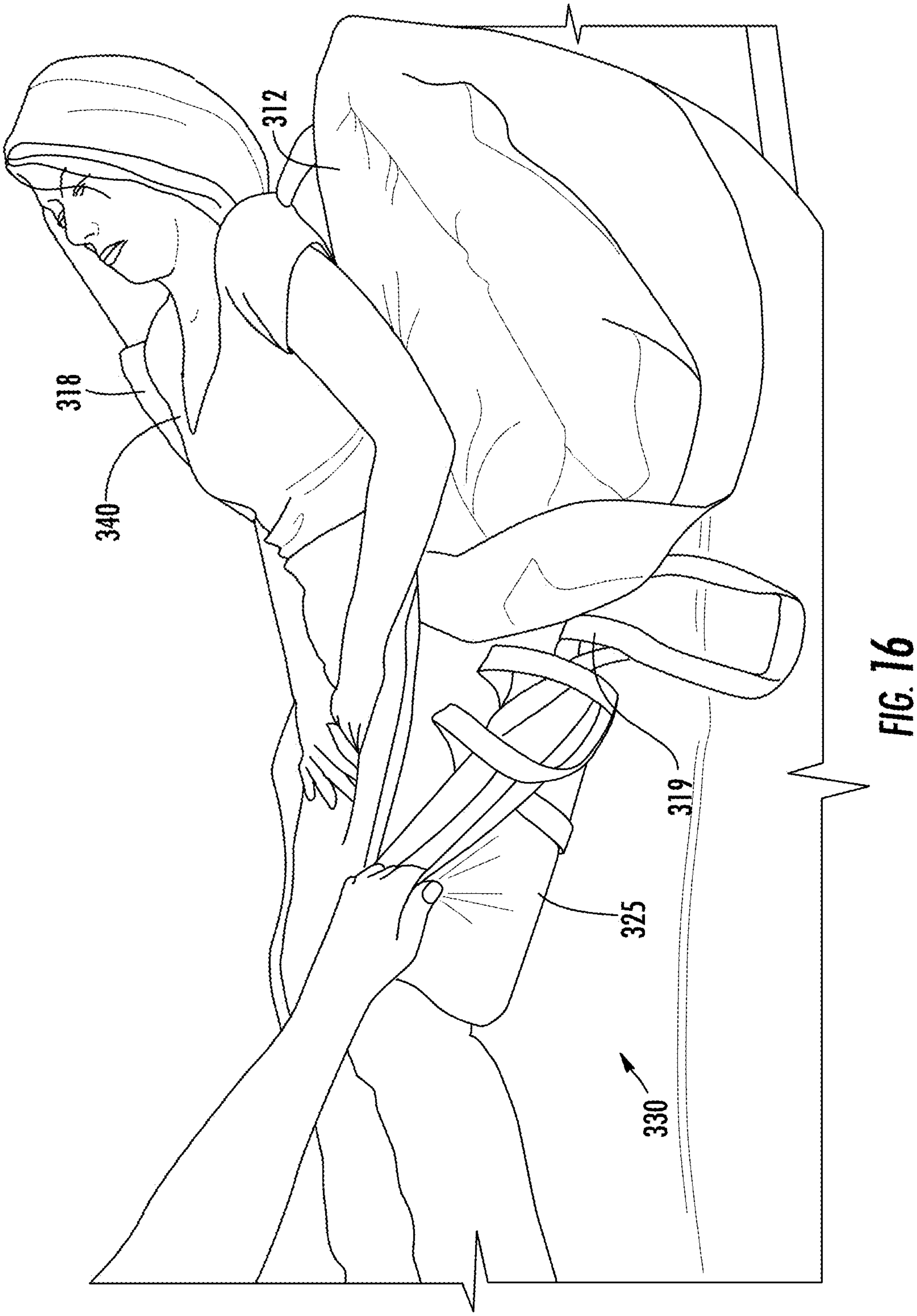
FIG. 16 is a schematic diagram of the system for sacral and trochanteric support in accordance with the teachings of the present invention when placed on a bed and in use by a user during folding of an extension of the cover and support.
Figure 17:
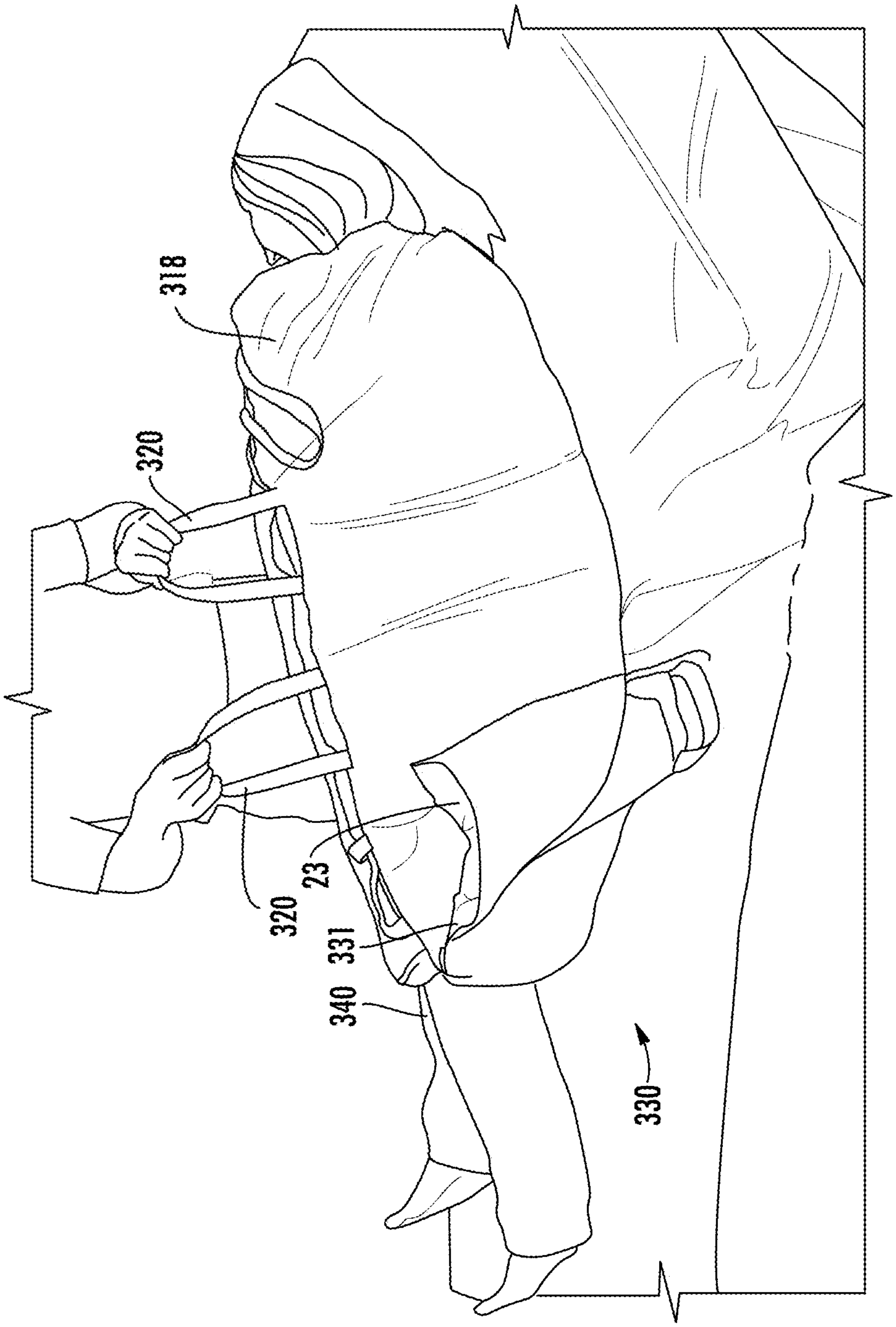
FIG. 17 is a schematic diagram of the system for sacral and trochanteric support in accordance with the teachings of the present invention when placed on a bed and in use by a user during turning of the user.

In one embodiment, user 340 can be moved or turned by using handles 320, as shown in FIG. 16. In one embodiment, positioner 23 can be positioned behind a side of cover 318 to push gas away from edges 322*a*, thereby aiding in turning of a user towards the opposite edge, as shown in FIG. 17. For example, if the patient is to be turned towards edge 322*b*, positioner 23 can be placed at edge 322*a* for displacing gas behind the patient to towards edge 322*b* of upper bladder 314, thereby pneumatically assisting in turning of the patient to face edge 322*b*.

Figure 18:
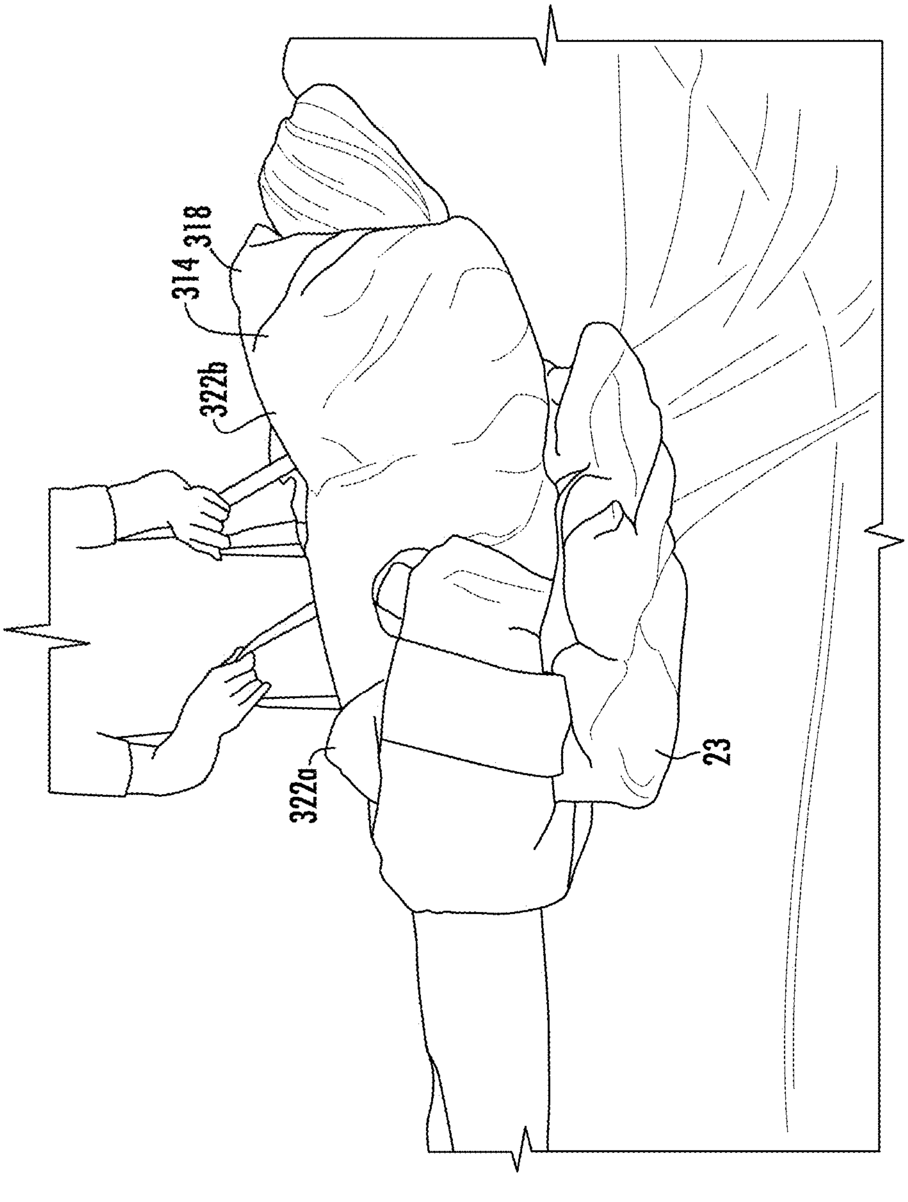
FIG. 18 is a schematic diagram of the system for sacral and trochanteric support in accordance with the teachings of the present invention when placed on a bed and in use including use of a positioner to aid in turning.
Figure 19:
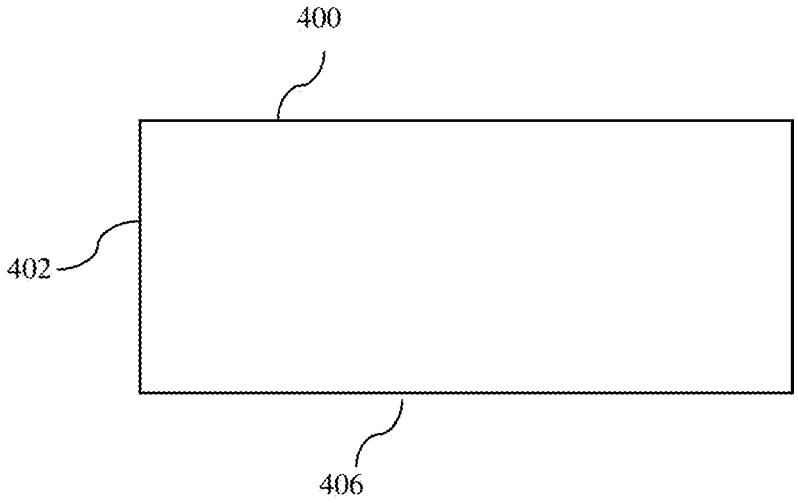
FIG. 19 is a schematic diagram of an alternate embodiment of a positioner used in the system for sacral and trochanteric support.

In one embodiment, positioner 400 can include ultra low pressure bladder 402, as shown in FIG. 18. The pressure within ultra low pressure bladder 402 is a range of less than about 20 mm of water to about 5 mm of water or a range of less than about 10 mm of water to about 5 mm of water. It will be appreciated that all equivalents such as mm Hg and PSI can be used for measuring the pressure within ultra low pressure bladder 402. In this embodiment, positioner 400 is formed with sufficient size and shape to displace an amount of gas in ultra low pressure bladder 402 to offload pressure from the received body part. Lower surface 406 of positioner 400 can be formed of a high friction material for preventing movement of positioner 400. Positioner 400 can be placed on top of first ultra low pressure plenum 12 and/or or second ultra low pressure plenum 32 or beneath ultra low pressure plenum 12 and/or second ultra low pressure plenum 32.

Positioner 400 can be placed over lower bladder 16 of ultra low pressure plenum 12 to displace gas from lower bladder 16 to upper bladder 14 in the direction of arrows $A_1$, as shown in FIG. 4.

In one embodiment, positioner 23 can be used together with positioner 400. Positioner 400 can be placed over lower bladder 16 of ultra low pressure plenum 12 positioner 23 can be positioned at one of edges 13*b* and 13*d* to push air away from respective edges 13*b* and 13*d* thereby aiding in turning of a patient towards the opposite edge, similar to positioner 23 as shown in FIG. 5. For example, if the patient is to be turned towards edge 13*d*, positioner 23 can be placed at edge 13*b* for displacing gas behind the patient to towards edge 13*b* of upper bladder 14, thereby pneumatically assisting in turning of the patient to face edge 13*d*.

Although it may be case that caregivers are well-trained in the use of patient offloading or turning and positioning systems, there are some instances in which such systems are improperly used due to uncertainty about the features and their intended use. Accordingly, one embodiment of this disclosure provides a series of markings 500 that may be positioned on various surfaces of an air plenum 502. The air plenum 502 may have any features of the above-described plenums. It should also be understood that the disclosed markings 500 may be used on other patient support systems/air plenums with similar instructions for use.

Figure 20:
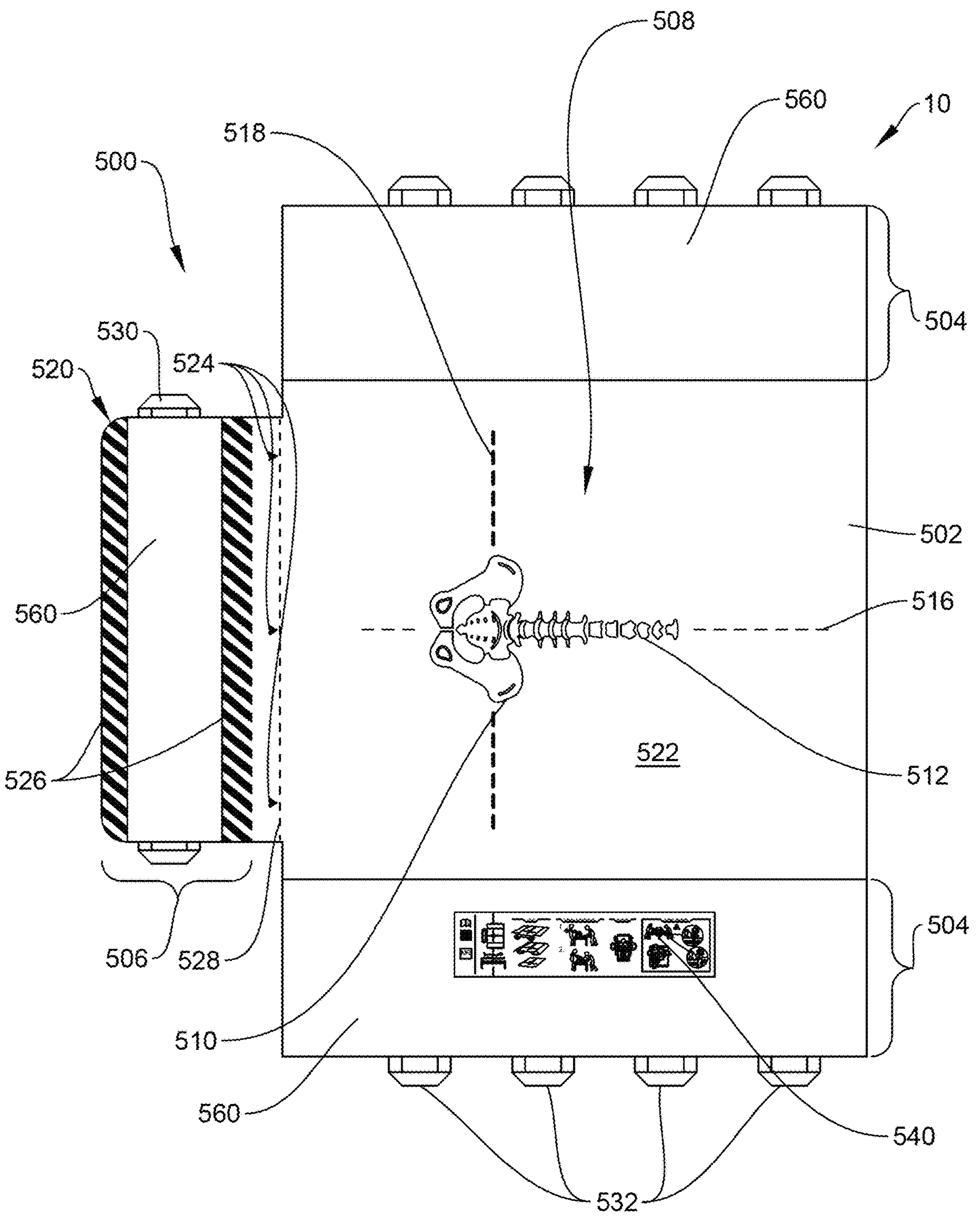
FIG. 20. is a top plan view of one embodiment of a patient support having markings designed to indicate proper use and patient positioning to a caregiver.
Figure 23:
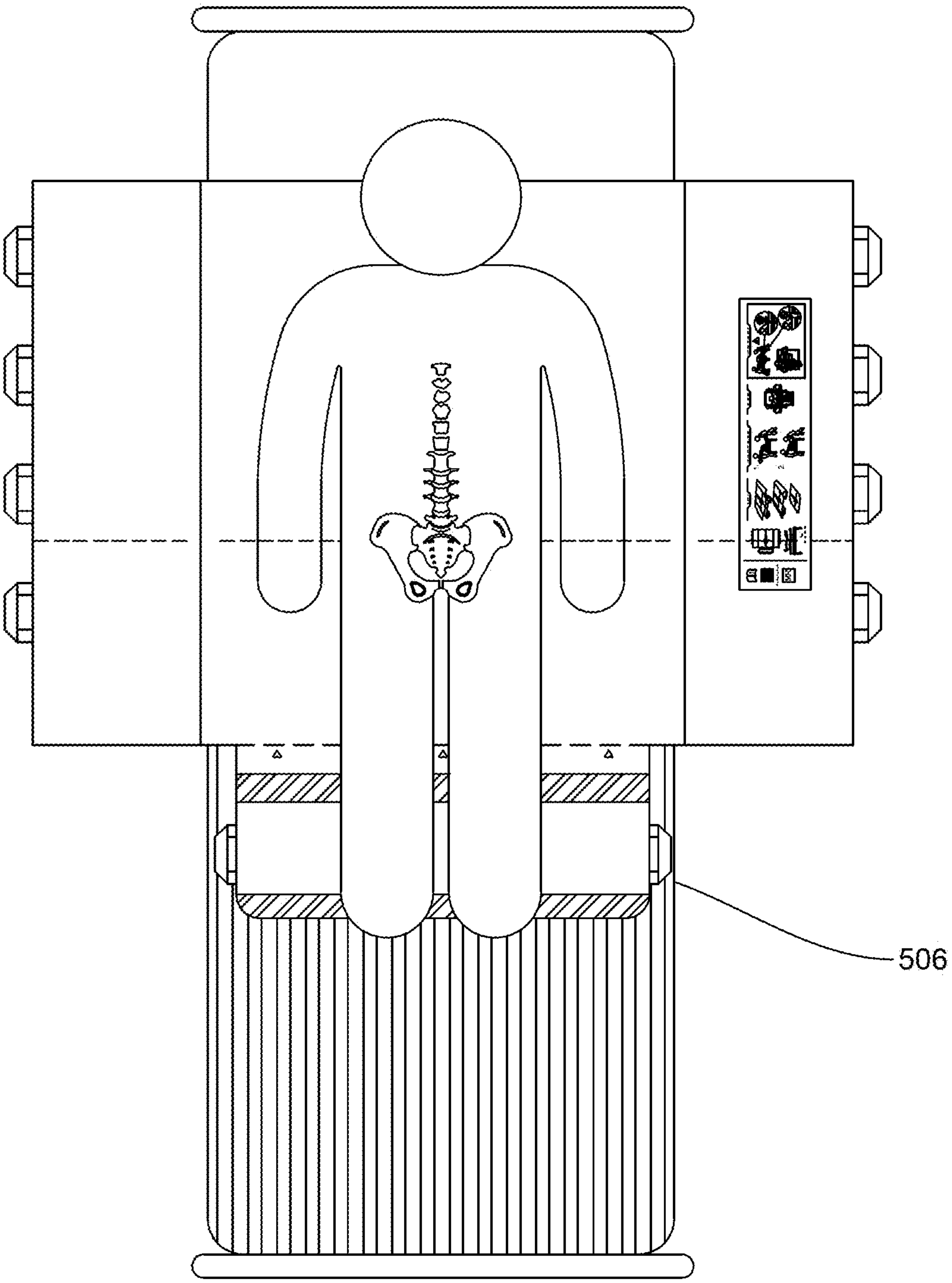
FIG. 23 is top plan view of the patient support of FIG. 20 on a hospital bed with a patient positioned thereon. The sides of the support are flared out for ease of viewing, but it should be understood that at least a portion of the sides may drape over the side of the bed and not be viewable from above.

Referring now to FIG. 20, there is shown an air plenum 502 having side extensions 504 and a lower extension 506. In use, the air plenum 502 is configured to be positioned on top of a hospital bed or other surface. Part or all of the side extensions 504 may hang down, adjacent to or alongside the hospital bed sides or other surface. The lower extension 506 will generally be positioned underneath a patient's leg or foot area, as illustrated by FIG. 23. The air plenum 502 is provided with markings 500 that indicate to a caregiver proper patient positioning and/or proper use of the lower extension 506.

First, an anatomical diagram 508 is positioned in a central location on the air plenum 502. The anatomical diagram 508 pictured is that of a patient's pelvis/sacrum area 510 and vertebral column 512. However, it should be understood that other anatomical diagrams are possible and considered within the scope of this disclosure. For example, it is possible to provide the desired location of a patient's head or other anatomical reference point with respect to the plenum 502. Although it is possible to use any color to indicate the anatomical diagram 508, it has been found particularly useful to provide such diagrams/graphics in white. Because the spine, pelvis and sacrum are bone structures and naturally white in color, it is believed that this color association may subconsciously emphasize the relation between the patient positioning and the anatomical diagram 508.

Markings 500 also include sacral guiding lines extending from the anatomical diagram 508 in the form of guiding lines or a grid extending in the lateral (x) and longitudinal (y) directions from the anatomical markings. The longitudinal (y) portion 516 of the grid can help align the entirety of the patient's spine body on the plenum 502. The lateral (x) portion 518 of the grid, which actually functions as a lateral sacrum line, provides a lateral extension of the sacrum area. In a specific example, this line 518 may run around the product and serve as a support guide to ensure that the patient is properly placed—and that the proper position is maintained throughout the daily patient care. The lateral portion 518 may be marked more thickly than the perpendicularly-oriented longitudinal portion 516 because it is generally more visible when the patient is positioned upon the plenum 502. Used either alone or in combination, these markings 500 can help align the patient on the plenum 502. Although multiple options are illustrated, it is possible to provide only a single anatomical diagram 508 and/or only a single lateral marking 516 or longitudinal marking 518.

The plenum 502 is also illustrated as having tail markings 520 on the lower extension 506. In use, the lower extension may be folded underneath the main body 522 of the air plenum 502. When the lower extension 506 is tucked underneath the plenum 502, a "hump" of two air bladders is formed, which secures an improved offloading of the sacrum area of the patient. As described above, it is possible to provide the lower extension 506 as having a different coefficient of friction from the main body 522. In a specific example, the upper surface 560 of the lower extension 506 may have a higher coefficient of friction than the upper surface of the main body 522 of the air plenum 502. The result is that when the lower extension 506 is tucked underneath the plenum 502, the higher coefficient of friction surface now faces the lower bed surface and can help stop sliding or skidding of the system 10 with respect to the bed surface. The lower extension thus acts as a "parking break" to keep the patient in position and thereby secure proper offloading of the patient. However, such folding or tucking of the lower extension 506 (also referred to as the "tail") may not be intuitive. Accordingly, markings may include a series of small upward arrows 524 that call for action. Markings may also include a series of lines in a pattern 526 that indicate the area to be folded. A boundary line 528 helps identify the location at which the tail 506 should be tucked. Although any color markings are possible and considered within the scope of this disclosure, it has been found that providing tail markings 520 in red help call for action. They signal to the caregiver: "do not forget to tuck the tail." The tail is optimally tucked in order for the patient to be properly positioned for offloading for optimal pressure ulcer protection, and also counteracts the patient sliding down in bed when the head of the bed is elevated. A side handle 530 is also provided on the lower extension 506. Caregivers may grasp the side handle 530 in order to fold/tuck/move the lower extension 506 underneath the main body 522. Again, although any color is possible, it has been found useful to provide the side handle 530 in red. As illustrated by the "tucking" pictogram shown and described below, it is also possible to tuck the side extensions 504 underneath the main body 522 using a similar method. The side extensions 504 may be tucked to adjust the air displacement in the plenum, and may be varied depending on the size of the patient.

Figure 21:
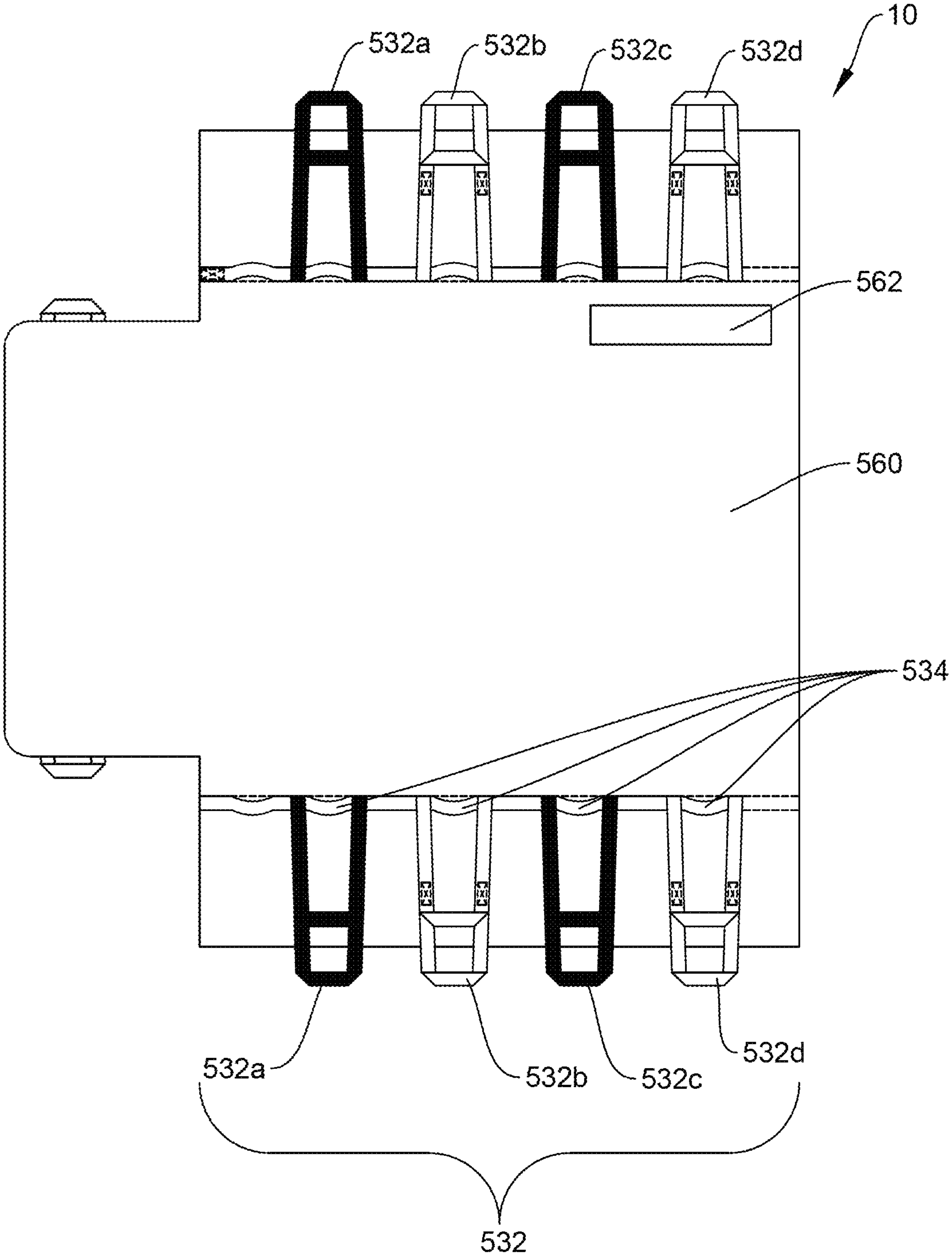
FIG. 21 is a bottom plan view of the patient support of FIG. 20.

FIG. 20 also illustrates a series of gripping handles 532 extending along the main body 522, visible from the edges. These gripping handles 532 are particularly useful for laterally turning the patient or for lateral transfer; i.e. transferring a patient from one bed or support to another. As described, it is possible to provide the lower surface of the air plenum 502 as having a low coefficient of friction that allows sliding of the system 10 with respect to a surface. FIG. 21 shows a bottom plan view of the patient support system 10. This view illustrates that the handle system may actually include a series of longer gripping handles 532 along with interspersed shorter handles 534. The shorter handles 534 are used to "boost" the patient; i.e. to move the patient (and the support) upwards or downwards in a bed or other support surface.

Figure 22:
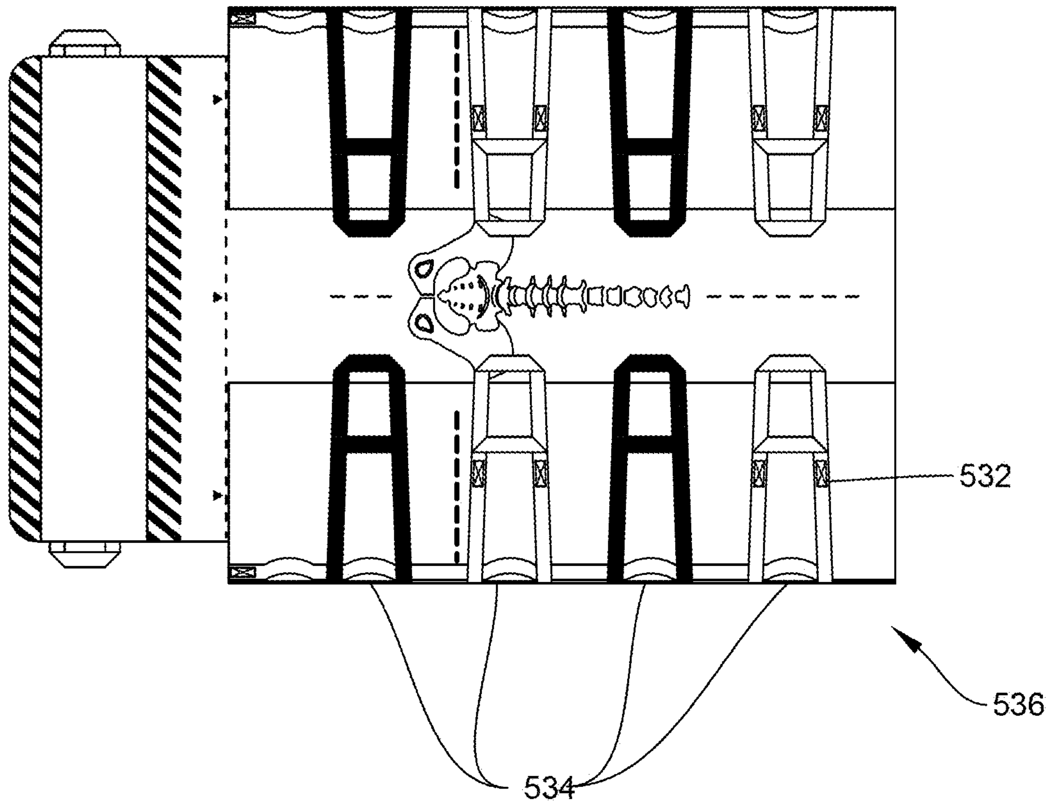
FIG. 22 is a top plan view of the patient support of FIG. 20 with sides folded up to reveal access to handles on the lower surface.

In a specific embodiment, the gripping handles 532 may be alternately colored. By replacing every other handle with a handle of a different color, it may be easier for caregivers to identify and grasp the corresponding handle on the assigned side in order to provide an evenly distributed weight lift and boosting the patient. The general goal is that the color difference between the handles provides the ability for caregivers to recognize and separate the handles when preparing and organizing the boosting grip. As mentioned hereinbefore, the shorter handles 534 are interspersed between the longer gripping handles 532, and are used for boosting the patient. For example, when two caregivers are standing on opposite sides of a bed or other surface, and are preparing to boost a patient, the difference in color of the longer handles, i.e., black handles 532*a*, 532*c,* and gray handles 532*b,* 532*d,* facilitates grasping of the correct short handle 532 (not visible during boosting). This may ease communication between caregivers, and also prevents a skewed boosting, which may be harmful to the patient. The difference in color is intended to make it easier to verbally address interactions with the specific handle. In some instances, the side extensions 504 may be folded on top of the main body 522 in order to achieve greater maneuverability, as shown in FIG. 22. In this example, caregivers are given access to a series of shorter handles 534. In a specific example shown, shorter handles 534 may be positioned at a base area 536 of each of the longer gripping handles 532. In another example, the shorter handles 534 may be positioned in between longer gripping handles 532. These handles may also be alternately color-coded if desired. It should also be understood that alternate handle configurations are possible and considered within the scope of this disclosure. The specific configuration has been found to be particularly useful and has thus been described in detail herein.

FIG. 21 also illustrates a positioner location marking 562. This marking 562 can help show a caregiver where a positioner (as described above) or pillow may be positioned in order to help effectively position the patient. Although illustrated by this Figure as being positioned on the bottom surface of the system, it should be understood that this marking 562 may be positioned on the top surface, bottom surface, or on both surfaces.

Figure 24:
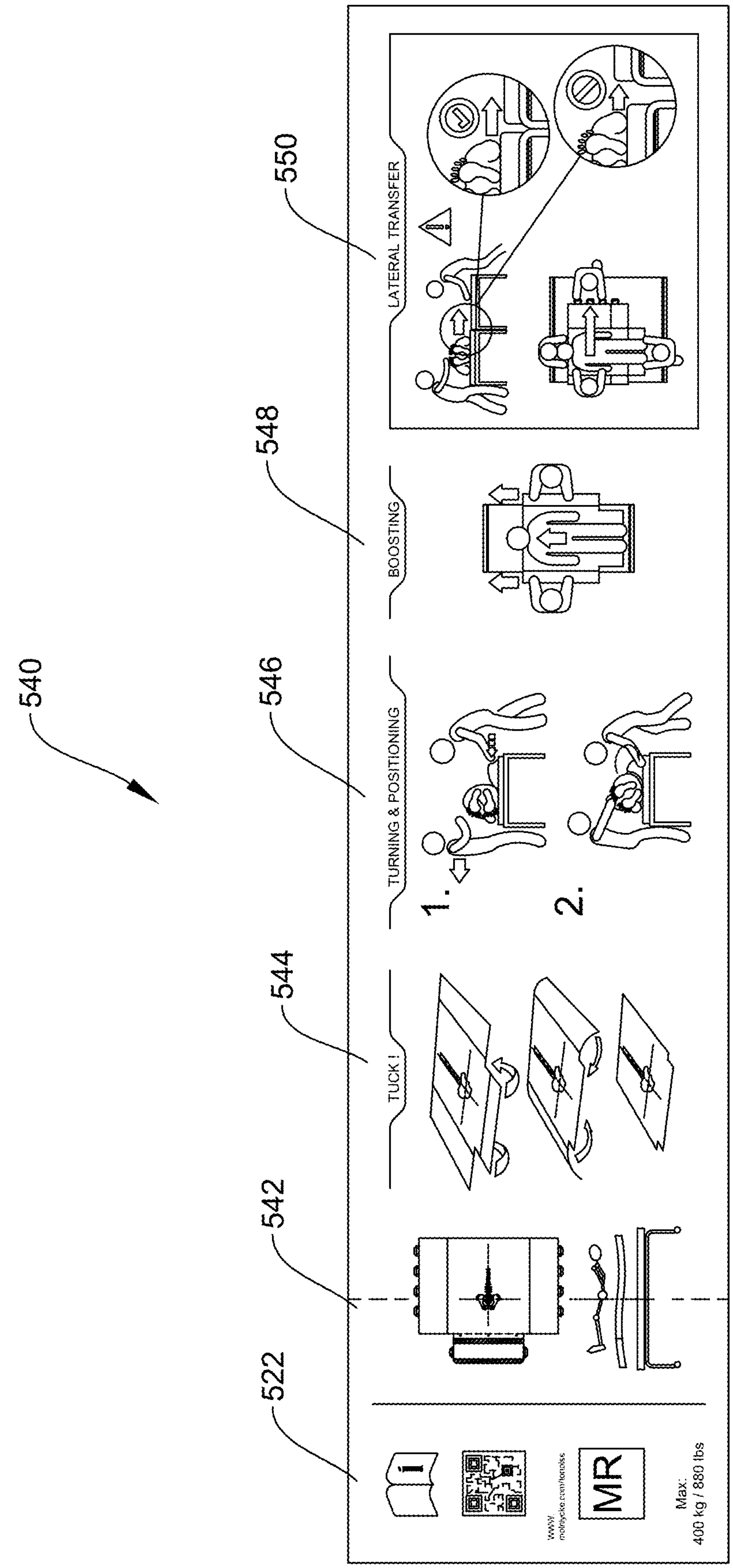
FIG. 24 is a close up view of certain instructional markings on the patient support.

FIG. 20 also illustrates a pictogram 540. The pictogram 540 pictorially depicts suggested use of the patient support system. Pictogram 540 may be positioned anywhere on the support system as deemed appropriate. It has been found particularly helpful to position the pictogram 540 on one of the side extensions 504. This placement allows access by a caregiver even when the patient is positioned on the patient support system, as illustrated by FIG. 23. FIG. 24 illustrates various options that may be provided on the pictogram 540. A first pictogram 542 illustrates appropriate steps for positioning a patient on the positioned system 10. A second pictogram 544 illustrates appropriate steps for tucking the lower extension and/or sides of the plenum. A third pictogram 546 illustrates appropriate steps for turning and positioning of a patient. A fourth pictogram 548 illustrates appropriate steps for boosting a patient. A fifth pictogram 550 illustrates appropriate steps for lateral transfer of a patient. All of the shown and described pictograms 540 may be provided in a single location. In another example, the pictograms may be provided different locations on the air plenum 502. It is generally envisioned that all pictograms will be provided, but it is possible to leave one or more pictograms out of the set.

The pictogram 540 may also feature a QR code 552 that may be scanned in order to provide the user with more information about the product and further use instructions. The QR code may link the user to the manufacturer website, to an instructional video, or to any other appropriate instructional source.

It is to be understood that the above-described embodiments are illustrative of only a few of the many possible specific embodiments, which can represent applications of the principles of the invention. It should be understood that the various features described may be used in combination with other features. For example, if a feature is described in connection with a first embodiment, it should be understood that that same feature may be incorporated into a different embodiment within the scope of this disclosure, even if not explicitly described herein. Numerous and varied other arrangements can be readily devised in accordance with these principles by those skilled in the art without departing from the spirit and scope of the invention.

What is claimed is:

1. A support system for a body part comprising:

a plenum including a gas therein, said plenum configured to a shape to fit underneath a patient and support the lower back and hips of the patient, the plenum comprising:

a main body comprising two side extensions and a lower extension, the lower extension having a first width that is smaller than a second width of the main body, the two side extensions configured to hang alongside a hospital bed or other surface in use, the lower extension configured to be tucked underneath the main body for additional offloading in use, a series of markings on the plenum indicating to a caregiver of a use of the plenum, wherein the series of markings comprise markings on the main body of:

(a) anatomical markings of a pelvis, a vertebral column, or both;

(b) guiding lines extending in a lateral direction, a longitudinal direction, or both; or (c) both (a) and (b); and at least one handle positioned along the main body, along the lower extension, or both.

2. The support system of claim 1, wherein the at least one handle comprises a plurality of handles along the main body and at least one handle along the lower extension.

3. The support system of claim 1, further comprising a second set of markings on the lower extension indicating to a user to tuck the lower extension underneath the main body.

4. The support system of claim 3, further comprising a third set of markings on one of the side extensions that comprise an instructional pictogram containing one or more images illustrating proper use of the support system.

5. The support system of claim 1, wherein the at least one handle comprises a plurality of handles of differing colors.

6. The support system of claim 5, wherein every other handle comprises a different color.

7. The support system of claim 1, wherein the at least one handle comprises a first set of handles comprising a first length and a second set of handles comprising a second length, wherein the first length is longer than the second length.

8. The support system of claim 1, wherein the plenum comprises an upper-facing surface and a surface-facing surface, wherein the at least one handle is secured to an edge of the surface-facing surface such that the two side extensions covers the at least one handle when the side extensions hang alongside the hospital bed or other surface.

9. The support system of claim 8, wherein the at least one handle is accessible when the two side extensions are lifted or folded on top of the main body.

10. The support system of claim 1, further comprising a positioner location marking positioned on a surface-facing side of the plenum.

11. The support system of claim 10, further comprising a positioner adapted to be received beneath the plenum, wherein the positioner displaces said gas within the plenum.

12. The support system of claim 1, wherein pressure within the plenum is less than about 20 mm of water to about 5 mm of water.

13. The support system of claim 1, wherein pressure within of the plenum is less than about 10 mm of water to about 5 mm of water.

14. The support system of claim 1, wherein a surface-facing surface of the plenum has a lower coefficient of friction than an upper-facing surface.

15. The support system of claim 1, further comprising a cover having a size to fit over the plenum, the cover including an extension adapted to be received over the lower extension, an upper surface of the extension including a portion formed of a material having a higher coefficient of friction than other areas of the cover.

16. The support system of claim 15, wherein the cover includes the at least one handle attached adjacent edges of a rear surface of the cover.

17. A method of supporting a body part comprising the steps of:

providing a patient support plenum comprising a main body comprising:

two side extensions and a lower extension, the lower extension having a first width that is smaller than a second width of the main body, the two side extensions configured to hang alongside a hospital bed or other surface in use, the lower extension configured to be tucked underneath the main body for additional offloading in use;

a series of markings on the patient support plenum indicating to a caregiver of a use of the patient support plenum, wherein;

the series of markings comprise a first set of markings on the main body of:

(a) anatomical markings of a pelvis, a vertebral column, or both;

(b) guiding lines extending in a lateral direction, a longitudinal direction, or both; or (c) both (a) and (b); and the main body further comprises a plurality of color-coded handles;

reviewing the series of markings in order to determine appropriate patient positioning;

positioning a patient on a support system using the series of markings as a guide; and (a) gripping the plurality of color-coded handles for movement of the patient, (b) gripping the plurality of color-coded handles for tucking the lower extension underneath the main body, or (c) both.

18. The method of claim 17, wherein the lower extension comprises an upper-facing surface with a higher coefficient of friction than a surface-facing surface of the lower extension.

19. The method of claim 17, further comprising positioning a positioner underneath the main body to displace gas within the patient support plenum.

* * * * *